(12) United States Patent
Nakayama

(10) Patent No.: US 8,625,022 B2
(45) Date of Patent: Jan. 7, 2014

(54) IMAGE BLUR CORRECTION APPARATUS AND IMAGING APPARATUS

(75) Inventor: Tatsuyuki Nakayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 289 days.

(21) Appl. No.: 13/074,547

(22) Filed: Mar. 29, 2011

(65) Prior Publication Data

US 2011/0317060 A1 Dec. 29, 2011

(30) Foreign Application Priority Data

Jun. 24, 2010 (JP) ................................ 2010-143692

(51) Int. Cl.
*G03B 13/00* (2006.01)
*H04N 5/232* (2006.01)

(52) U.S. Cl.
USPC .......... 348/357; 348/374; 359/813; 359/814; 359/824

(58) Field of Classification Search
USPC ............ 348/357, 208.99, 208.5, 374; 396/55, 396/813, 814, 824
See application file for complete search history.

(56) References Cited

U.S. PATENT DOCUMENTS

| | | | | |
|---|---|---|---|---|
| 5,305,040 | A | | 4/1994 | Enomoto |
| 6,603,927 | B2 * | | 8/2003 | Enomoto ........................ 396/55 |
| 7,440,687 | B2 * | | 10/2008 | Seo ................................ 396/55 |
| 7,623,776 | B2 * | | 11/2009 | Makii ............................. 396/55 |
| 7,714,893 | B2 * | | 5/2010 | Makii ....................... 348/208.99 |
| 8,014,659 | B2 * | | 9/2011 | Nakayama ...................... 396/55 |
| 8,149,284 | B2 * | | 4/2012 | Hasegawa et al. ......... 348/208.4 |
| 8,270,823 | B2 * | | 9/2012 | Lee ................................ 396/55 |
| 8,311,404 | B2 * | | 11/2012 | Nakayama ...................... 396/55 |
| 2005/0276588 | A1 * | | 12/2005 | Tsutsumi ........................ 396/55 |
| 2006/0007320 | A1 * | | 1/2006 | Seo ........................... 348/219.1 |
| 2009/0060485 | A1 * | | 3/2009 | Takahashi ....................... 396/55 |
| 2009/0225177 | A1 | | 9/2009 | Maeda et al. |
| 2009/0309982 | A1 * | | 12/2009 | Rouvinen et al. .......... 348/208.2 |

FOREIGN PATENT DOCUMENTS

| | | |
|---|---|---|
| JP | 6-35022 | 2/1994 |
| JP | 8-194241 | 7/1996 |
| JP | 2009-42369 | 2/2009 |

OTHER PUBLICATIONS

U.S. Appl. No. 13/090,570, filed Apr. 20, 2011, Nakayama.

* cited by examiner

*Primary Examiner* — Roberto Velez
*Assistant Examiner* — Cynthia Segura
(74) *Attorney, Agent, or Firm* — Oblon, Spivak, McClelland, Maier & Neustadt, L.L.P.

(57) ABSTRACT

An image blur correction apparatus includes: a fixed member; a first driven unit pivotally supported by the fixed member around a first support shaft extending in a direction parallel to an optical axis direction; a second driven unit holding a lens or an imaging device and pivotally supported by the first driven unit around a second support shaft extending in the direction parallel to the optical axis direction; a first actuator that pivots the first and second driven units around the first support shaft; and a second actuator that pivots the second driven unit around the second support shaft.

10 Claims, 20 Drawing Sheets

IMAGE BLUR CORRECTION APPARATUS AND IMAGING APPARATUS

BACKGROUND OF THE INVENTION

1. Field of the Invention

The present invention relates to a technological field of an image blur correction apparatus and an imaging apparatus, and particularly to a technological field in which performance in blur correction is improved by placing first and second actuators in predetermined positions in consideration of the positional relationship among a first support shaft, a second support shaft, and a lens or any other component.

2. Description of the Related Art

Some video camcorders, still cameras, and other imaging apparatus include an image blur correction apparatus that corrects image blur by moving a lens or an imaging device in directions perpendicular to the optical axis direction.

Some image blur correction apparatus of this type include a first driven unit pivotally supported by a fixed member around a first support shaft and a second driven unit pivotally supported by the first driven unit around a second support shaft, and the first and second support shafts are so disposed that they extend in the direction parallel to the optical axis direction (see JP-A-6-35022, for example).

In the image blur correction apparatus described in JP-A-6-35022, a line extending in the direction determined by connecting the center of the first support shaft to the center of a lens or any other component is perpendicular to a line extending in the direction determined by connecting the center of the second support shaft to the center of the lens or the any other component, and the center of the lens or the any other component is located at the intersection of the two lines.

In this image blur correction apparatus, in which the second driven unit holds the lens or an imaging device, when the first driven unit is pivoted around the first support shaft relative to the fixed member in a first direction perpendicular to the optical axis direction, the second driven unit supported by the first driven unit is driven in response to the pivotal motion of the first driven unit and the lens or the imaging device is moved in the first direction. Further, when the second driven unit is pivoted around the second support shaft relative to the first driven unit in a second direction perpendicular to the optical axis direction and the first direction, the lens or the imaging device is moved in the second direction.

The image blur correction apparatus further includes a first actuator that pivots the first and second driven units in the first direction and a second actuator that pivots the second driven unit in the second direction. The first actuator is present on the line extending in the direction determined by connecting the center of the first support shaft to the center of the lens or the imaging device, and the second actuator is present on the line extending in the direction determined by connecting the center of the second support shaft to the center of the lens or the imaging device.

SUMMARY OF THE INVENTION

In the image blur correction apparatus described in JP-A-6-35022, however, the positional relationship among the centers of the three components, the first support shaft, the second support shaft, and the lens, is so set that the line extending in the direction determined by connecting the center of the first support shaft to the center of the lens or the imaging device is perpendicular to the line extending in the direction determined by connecting the center of the second support shaft to the center of the lens or the imaging device and the center of the lens or the imaging device is present at the intersection of the two lines, as described above.

In this case, when the first driven unit is pivoted around the first support shaft in the first direction, the second support shaft is disadvantageously moved in the direction inclined by approximately 45 degrees to the second direction, which is the direction in which the second driven unit is driven. As a result, correction made in the first direction greatly affects correction made in the second direction, disadvantageously resulting in degradation of the performance in blur correction.

Thus, it is desirable to provide an image blur correction apparatus and an imaging apparatus that solves the problem described above and improves the performance in blur correction.

According to an embodiment of the invention, there is provided an image blur correction apparatus including a fixed member, a first driven unit pivotally supported by the fixed member around a first support shaft extending in a direction parallel to an optical axis direction, a second driven unit holding a lens or an imaging device and pivotally supported by the first driven unit around a second support shaft extending in the direction parallel to the optical axis direction, a first actuator that pivots the first and second driven units around the first support shaft, and a second actuator that pivots the second driven unit around the second support shaft. When a first line is defined as a line extending in a direction determined by connecting the center of the first support shaft to the center of the second support shaft, and a second line is defined as a line extending in a direction determined by connecting the center of the second support shaft to the center of the lens or the imaging device, the first line and the second line are perpendicular to each other, and a substantially central portion of the first actuator and a substantially central portion of the second actuator are present on the first or second line.

In the image blur correction apparatus, when the first driven unit is pivoted around the first support shaft, the second support shaft is not moved in the direction inclined by approximately 45 degrees to the direction in which the second driven unit is driven.

In the image blur correction apparatus described above, it is desirable that a substantially central portion of the first actuator is present on the first line, and that a substantially central portion of the second actuator is present on the second line.

When a substantially central portion of the first actuator is present on the first line and a substantially central portion of the second actuator is present on the second line, the substantially central portion of the first actuator is positioned on a line extending in the direction determined by connecting the center of the first support shaft to the center of the second support shaft, and the substantially central portion of the second actuator is positioned on a line extending in the direction determined by connecting the center of the second support shaft to the center of the lens or the imaging device.

The image blur correction apparatus described above desirably further includes a first detection device that detects the position of the first driven unit in the direction of the pivotal motion thereof and a second detection device that detects the position of the second driven unit in the direction of the pivotal motion thereof. The first detection device is desirably disposed on the first line, and the second detection device is desirably disposed on the second line.

When the first detection device is disposed on the first line and the second detection device is disposed on the second line, the first detection device is positioned on a line extending in the direction determined by connecting the center of the first support shaft to the center of the second support shaft, and the second detection device is positioned on a line extending in the direction determined by connecting the center of the second support shaft to the center of the lens or the imaging device.

In the image blur correction apparatus described above, a substantially central portion of the first actuator and a substantially central portion of the second actuator are desirably present on the second line.

When a substantially central portion of the first actuator and a substantially central portion of the second actuator are present on the second line, the substantially central portion of the first actuator and the substantially central portion of the second actuator are positioned on a line extending in the direction determined by connecting the center of the second support shaft to the center of the lens or the imaging device.

The image blur correction apparatus described above desirably further includes a first detection device that detects the position of the second driven unit in the direction of the first line in the direction of the pivotal motion of the second driven unit and a second detection device that detects the position of the second driven unit in the direction of the second line in the direction of the pivotal motion of the second driven unit. The first and second detection devices are desirably disposed on the second line.

When the first and second detection devices are disposed on the second line, the first and second detection devices are positioned on a line extending in the direction determined by connecting the center of the second support shaft to the center of the lens or the imaging device.

The image blur correction apparatus described above desirably further includes a pair of guide shafts both axial ends of each of which are fixed to the fixed member. The second driven unit is desirably supported by the pair of guide shafts.

When the second driven unit is supported by a pair of guide shafts, no guide shaft for supporting the first driven unit is necessary.

According to another embodiment of the invention, there is provided an imaging apparatus including an image blur correction apparatus that corrects image blur by moving a lens or an imaging device in a direction perpendicular to an optical axis direction, the image blur correction apparatus including a fixed member, a first driven unit pivotally supported by the fixed member around a first support shaft extending in a direction parallel to the optical axis direction, a second driven unit holding the lens or the imaging device and pivotally supported by the first driven unit around a second support shaft extending in the direction parallel to the optical axis direction, a first actuator that pivots the first and second driven units around the first support shaft, and a second actuator that pivots the second driven unit around the second support shaft. When a first line is defined as a line extending in a direction determined by connecting the center of the first support shaft to the center of the second support shaft, and a second line is defined as a line extending in a direction determined by connecting the center of the second support shaft to the center of the lens or the imaging device, the first line and the second line are perpendicular to each other, and a substantially central portion of the first actuator and a substantially central portion of the second actuator are present on the first or second line.

In the imaging apparatus, when the first driven unit is pivoted around the first support shaft, the second support shaft is not moved in the direction inclined by approximately 45 degrees to the direction in which the second driven unit is driven.

The image blur correction apparatus according to the embodiment of the invention includes a fixed member, a first driven unit pivotally supported by the fixed member around a first support shaft extending in a direction parallel to an optical axis direction, a second driven unit holding a lens or an imaging device and pivotally supported by the first driven unit around a second support shaft extending in the direction parallel to the optical axis direction, a first actuator that pivots the first and second driven units around the first support shaft, and a second actuator that pivots the second driven unit around the second support shaft. When a first line is defined as a line extending in a direction determined by connecting the center of the first support shaft to the center of the second support shaft, and a second line is defined as a line extending in a direction determined by connecting the center of the second support shaft to the center of the lens or the imaging device, the first line and the second line are perpendicular to each other, and a substantially central portion of the first actuator and a substantially central portion of the second actuator are present on the first or second line.

As a result, when the first driven unit is pivoted around the first support shaft, correction made in the direction in which the second driven unit is driven is affected little. Further, since the first and second driven units are driven efficiently, the performance in blur correction can be improved.

In the image blur correction apparatus described above, a substantially central portion of the first actuator may be present on the first line, and a substantially central portion of the second actuator may be present on the second line.

As a result, the lens or the imaging device can be driven more efficiently.

The image blur correction apparatus described above may further include a first detection device that detects the position of the first driven unit in the direction of the pivotal motion thereof and a second detection device that detects the position of the second driven unit in the direction of the pivotal motion thereof. The first detection device is disposed on the first line, and the second detection device is disposed on the second line.

As a result, the positions of the first and second driven units can be detected more precisely.

In the image blur correction apparatus described above, a substantially central portion of the first actuator and a substantially central portion of the second actuator may be present on the second line.

As a result, the lens or the imaging device can be driven more efficiently.

The image blur correction apparatus described above may further include a first detection device that detects the position of the second driven unit in the direction of the first line in the direction of the pivotal motion of the second driven unit and a second detection device that detects the position of the second driven unit in the direction of the second line in the direction of the pivotal motion of the second driven unit. The first and second detection devices are disposed on the second line.

As a result, the positions of the first and second driven units can be detected more precisely.

The image blur correction apparatus described above may further include a pair of guide shafts both axial ends of each of which are fixed to the fixed member. The second driven unit is supported by the pair of guide shafts.

As a result, the number of parts can be reduced, and the mechanism can be simplified.

The imaging apparatus according to the embodiment of the invention includes an image blur correction apparatus that corrects image blur by moving a lens or an imaging device in a direction perpendicular to an optical axis direction, the image blur correction apparatus including a fixed member, a first driven unit pivotally supported by the fixed member around a first support shaft extending in a direction parallel to the optical axis direction, a second driven unit holding the lens or the imaging device and pivotally supported by the first driven unit around a second support shaft extending in the direction parallel to the optical axis direction, a first actuator that pivots the first and second driven units around the first support shaft, and a second actuator that pivots the second driven unit around the second support shaft. When a first line is defined as a line extending in a direction determined by connecting the center of the first support shaft to the center of the second support shaft, and a second line is defined as a line extending in a direction determined by connecting the center of the second support shaft to the center of the lens or the imaging device, the first line and the second line are perpendicular to each other, and a substantially central portion of the first actuator and a substantially central portion of the second actuator are present on the first or second line.

As a result, when the first driven unit is pivoted around the first support shaft, correction made in the direction in which the second driven unit is driven is affected little. Further, since the first and second driven units are driven efficiently, the performance in blur correction can be improved.

DESCRIPTION OF THE PREFERRED EMBODIMENTS

Figure 1:
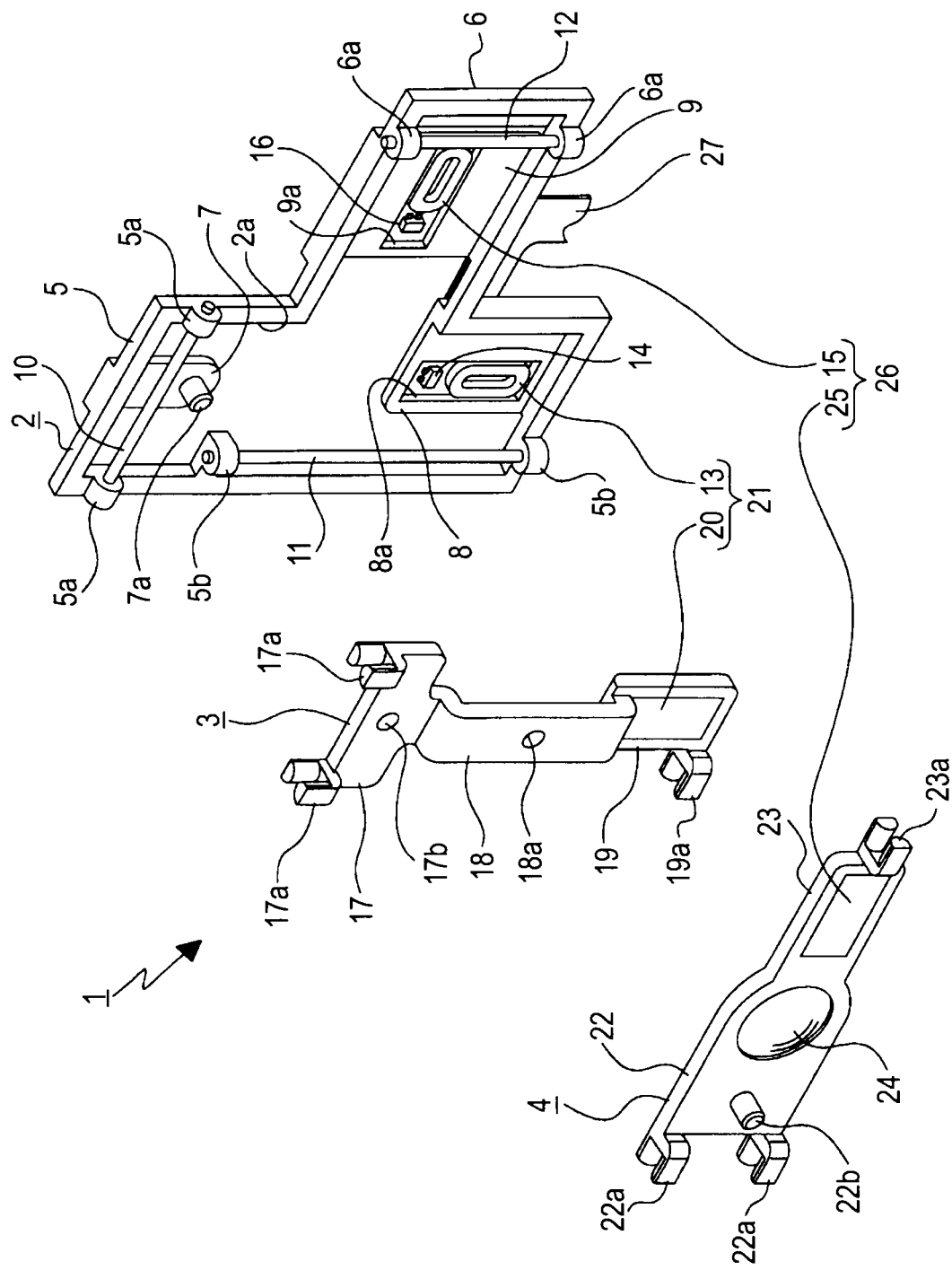
FIG. 1 along with FIGS. 2 to 9 shows an image blur correction apparatus according to a first embodiment of the invention and is an exploded perspective view.
Figure 2:
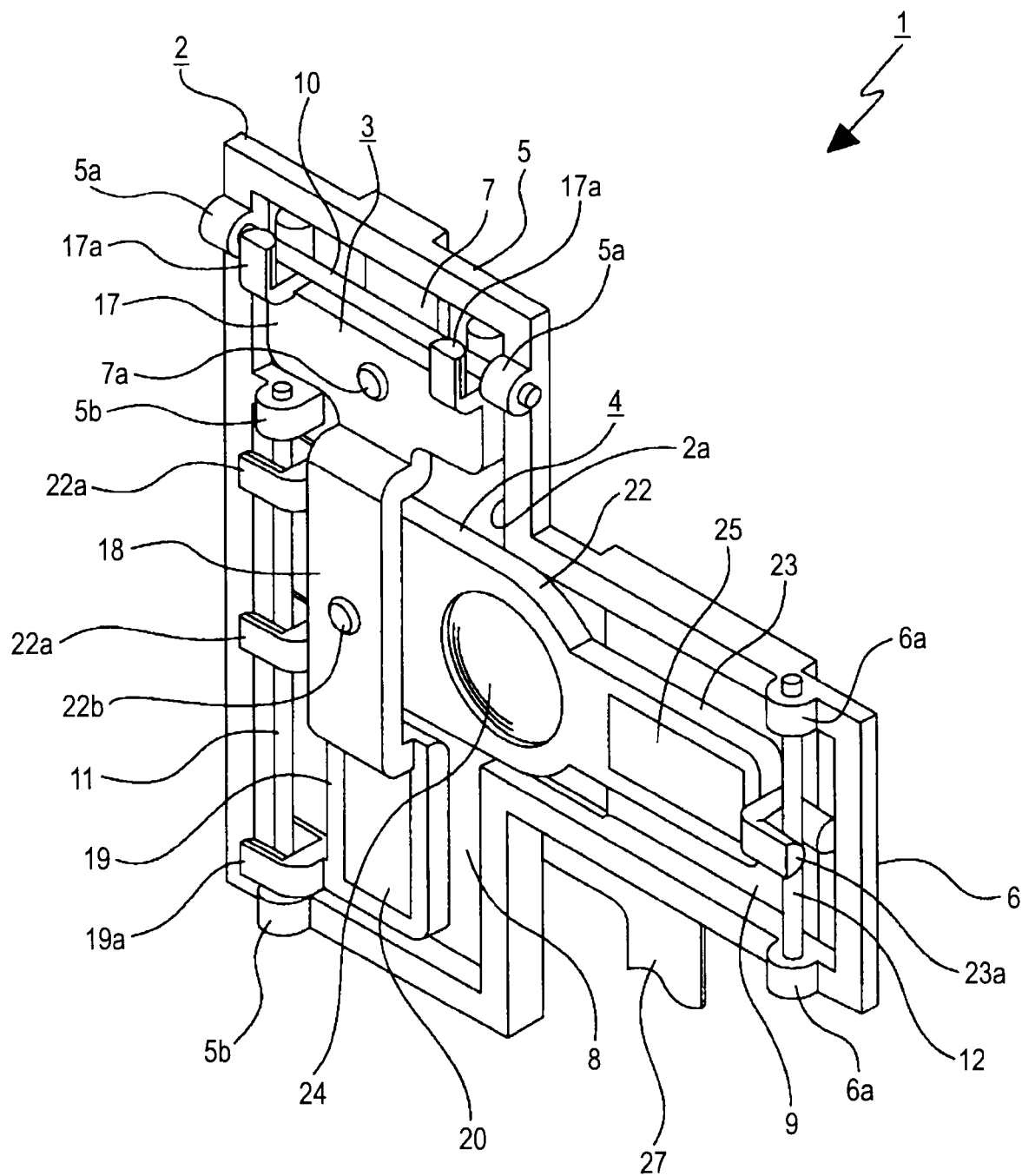
FIG. 2 is an enlarged perspective view.
Figure 3:
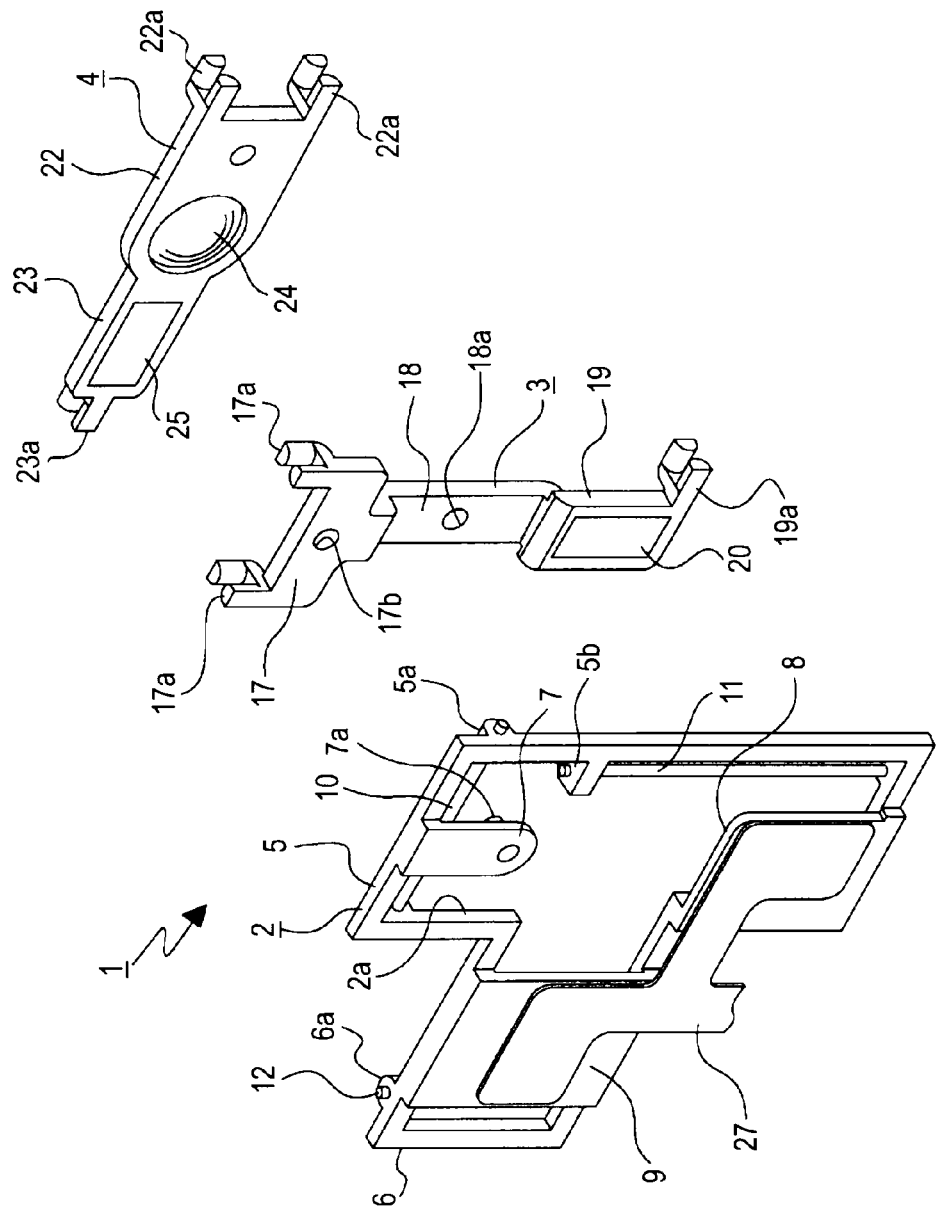
FIG. 3 is an exploded perspective view showing the image blur correction apparatus viewed in a direction different from that in FIG. 1.
Figure 4:
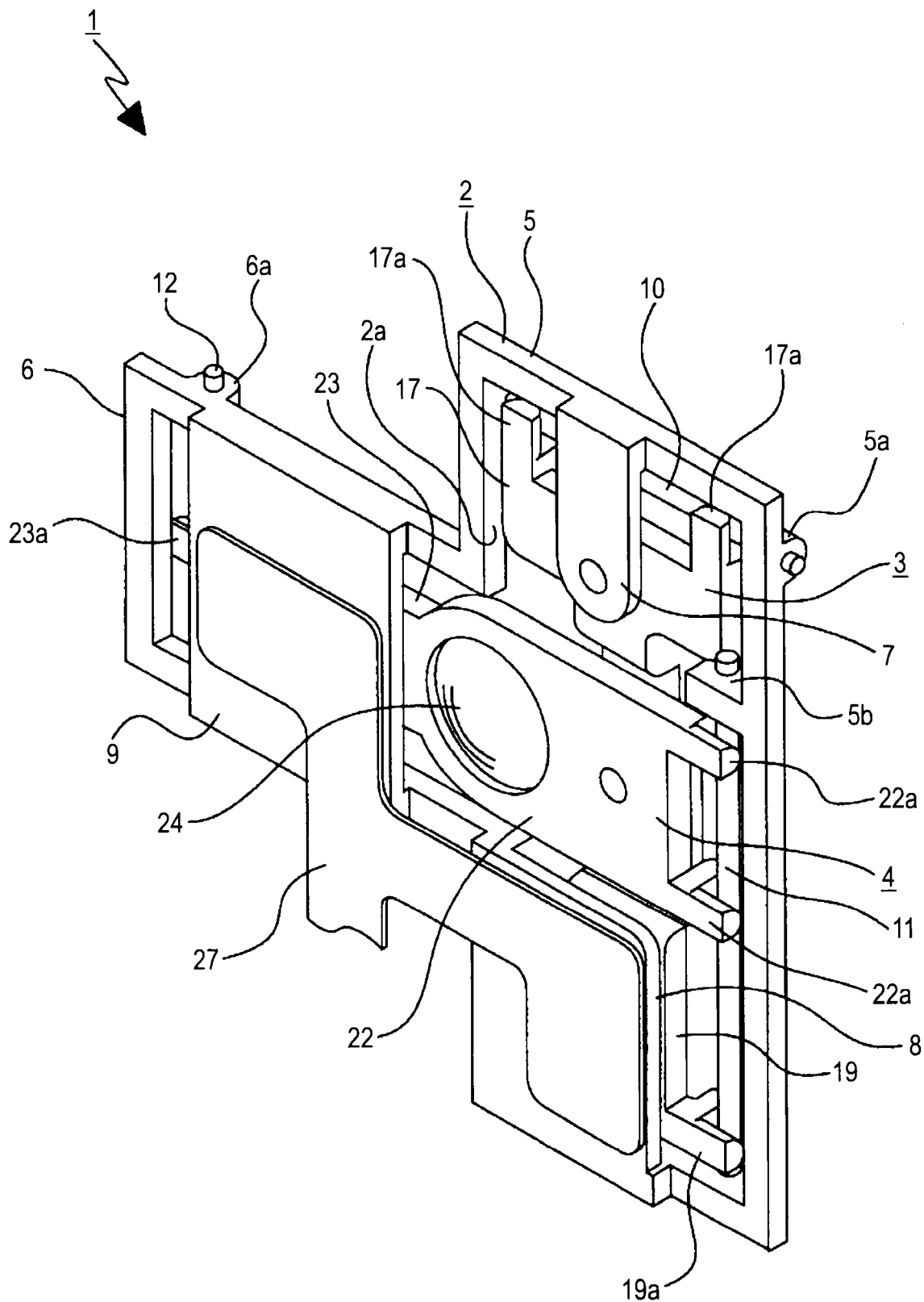
FIG. 4 is an enlarged perspective view showing the image blur correction apparatus viewed in a direction different from that in FIG. 2.
Figure 5:
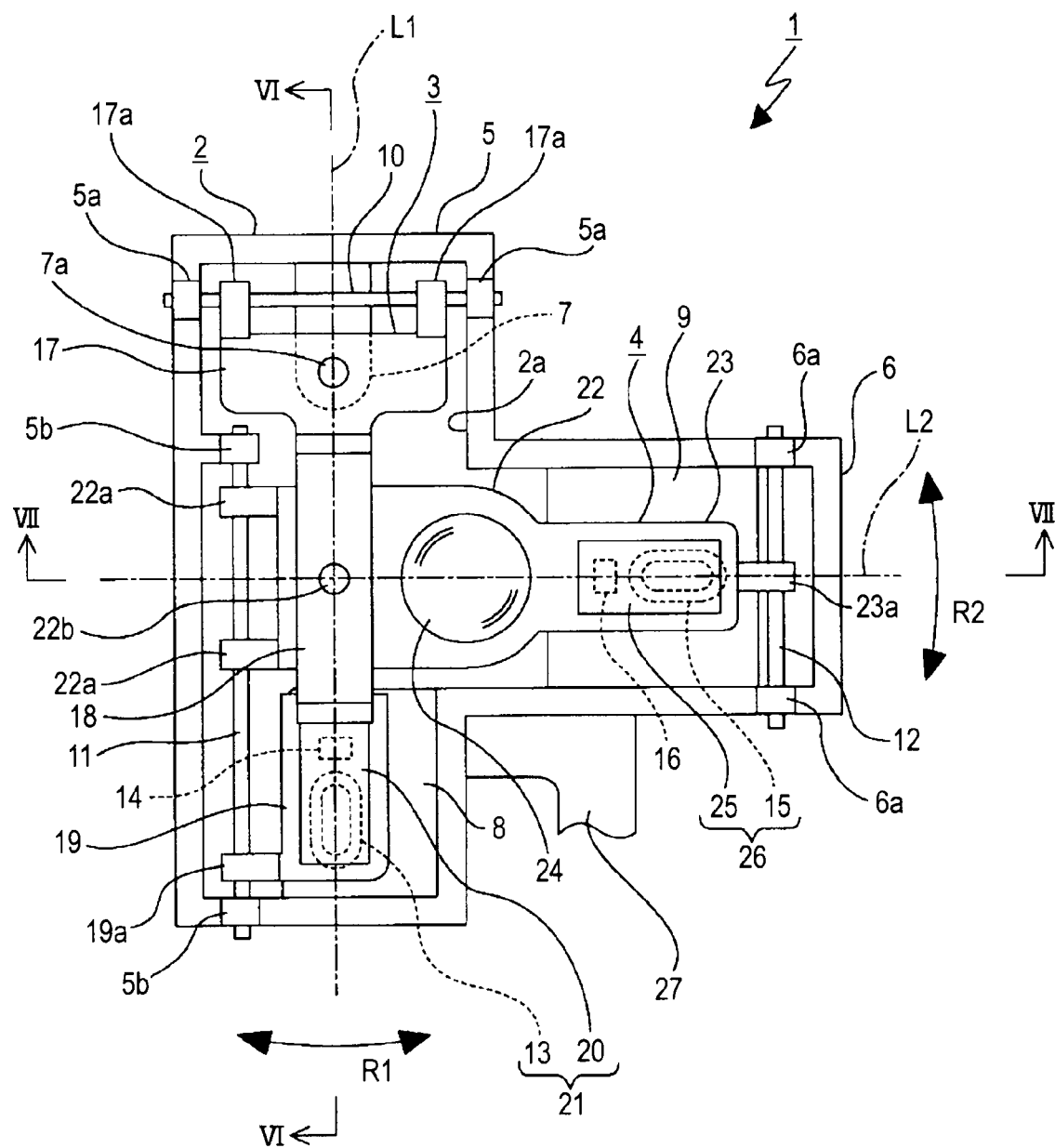
FIG. 5 is an enlarged front view.

Modes for implementing an image blur correction apparatus and an imaging apparatus according to the invention will be described below with reference to the accompanying drawings.

In the embodiments described below, the invention in the form of an imaging apparatus is applied to a video camcorder, and the invention in the form of an image blur correction apparatus is applied to an image blur correction apparatus incorporated in the video camcorder.

The coverage of the invention in the form of an imaging apparatus and an image blur correction apparatus is not limited to a video camcorder and an image blur correction apparatus incorporated in the video camcorder. The invention in the form of an imaging apparatus and an image blur correction apparatus is widely applicable, for example, to imaging apparatus incorporated in still cameras, mobile phones, personal digital assistants (PDAs), and a variety of other apparatus and image blur correction apparatus incorporated in the imaging apparatus described above.

In the following description, the forward, backward, upward, downward, rightward, and leftward directions are those viewed by an operator of the video camcorder when the operator captures images. In this case, a subject is present on the forward side, and the operator is present on the backward side.

The forward, backward, upward, downward, rightward, and leftward directions used in the following description are defined for ease of description. The invention is not limited to the definition but can be implemented based on other direction definitions.

The lens described below may be formed of a single lens or may be formed of a lens group including a plurality of lenses.

[Overall Configuration of Image Blur Correction Apparatus]

An image blur correction apparatus will first be described.

<First Embodiment>

A first embodiment of an image blur correction apparatus will be described below (see FIGS. 1 to 9).

An image blur correction apparatus 1 includes a fixed member 2, a first driven unit 3, and a second driven unit 4 (see FIGS. 1 to 5).

The fixed member 2 has a substantially T-like shape but rotated 90 degrees, include a vertically elongated first portion 5 and a rectangular second portion 6 protruding leftward from part of the first portion 5, a portion that does not include both end portions in the upward-downward direction. The fixed member 2 also has an opening 2a formed therethrough in the forward-backward direction.

The first portion 5 has a support protrusion 7 protruding downward from an upper end thereof, and a first support shaft 7a protruding forward is provided on a lower end portion of the support protrusion 7. The first portion 5 also has first shaft holding sections 5a, 5a located close to the upper end thereof and set apart from each other in the rightward-leftward direction. The first portion 5 further has second shaft holding sections 5b, 5b located close to the right end thereof and set apart from each other in the upward-downward direction.

A plate-shaped first coil attachment portion 8 oriented in the forward-backward direction is provided in a lower end portion of the first portion 5, and a placement hole 8a, which opens forward, is formed through the first coil attachment portion 8.

The second portion 6 has third shaft holding sections 6a, 6a located close to the left end thereof and set apart from each other in the upward-downward direction.

A plate-shaped second coil attachment portion 9 oriented in the forward-backward direction is provided in the second portion 6, and a placement hole 9a, which opens forward, is formed through the second coil attachment portion 9.

A first guide shaft 10 is attached between the first shaft holding sections 5a, 5a of the first portion 5. A second guide shaft 11 is attached between the second shaft holding sections 5b, 5b of the first portion 5. A third guide shaft 12 is attached between the third shaft holding sections 6a, 6a of the second portion 6.

A first drive coil 13 and a first detection device 14 are disposed side by side in the upward-downward direction in the placement hole 8a in the first coil attachment portion 8. A second drive coil 15 and a second detection device 16 are disposed side by side in the rightward-leftward direction in the placement hole 9a in the second coil attachment portion 9. Each of the first detection device 14 and the second detection device 16 is, for example, a magnetic detection device.

The first driven unit 3 is formed of a supported portion 17 extending in the rightward-leftward direction, a support portion 18 protruding downward from part of the supported portion 17, specifically, from a central portion thereof in the rightward-leftward direction, and a magnet attachment portion 19 protruding downward from the support portion 18.

First shaft receiving sections 17a, 17a, each of which opens upward, has a U-like shape, and is set apart from the other in the rightward-leftward direction, are provided at an upper end portion of the supported portion 17. The supported portion 17 also has a supported hole 17b passing therethrough in the forward-backward direction.

The support portion 18 is positioned forward relative to the supported portion 17 and the magnet attachment portion 19. The support portion 18 has a support hole 18a formed therethrough in the forward-backward direction.

A second shaft holding section 19a, which opens rightward and has a U-like shape, is provided at a right end portion of a lower end portion of the magnet attachment portion 19. A first magnet 20 is attached to the magnet attachment portion 19.

With the first support shaft 7a provided on the support protrusion 7 of the fixed member 2 inserted backward into the supported hole 17b formed through the supported portion 17, the first driven unit 3 is pivotally supported by the fixed member 2 around the first support shaft 7a.

Figure 6:
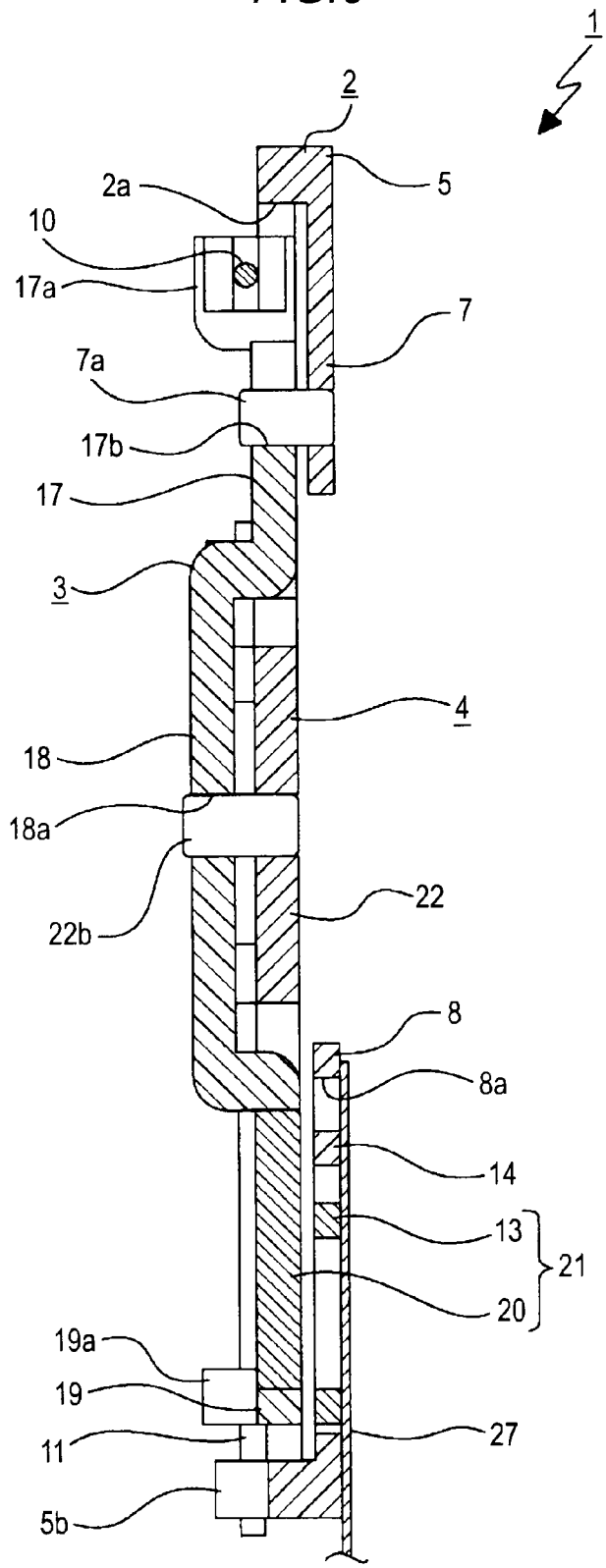
FIG. 6 is a cross-sectional view taken along the line VI-VI shown in FIG. 5.

With the first driven unit 3 pivotally supported by the fixed member 2, the first shaft receiving sections 17a, 17a are slidably supported by the first guide shaft 10, the second shaft receiving section 19a is slidably supported by the second guide shaft 11, and the first magnet 20 is positioned in front of and faces the first drive coil 13 and the first detection device 14 (see FIG. 6).

The first magnet 20 and the first drive coil 13 form a first actuator 21 that pivots the first driven unit 3 and the second driven unit 4 around the first support shaft 7a.

The second driven unit 4 is so shaped that it extends in the rightward-leftward direction and is formed of a lens attachment portion 22 and a magnet attachment portion 23 protruding leftward from the lens attachment portion 22 (see FIGS. 1 to 5).

First shaft receiving sections 22a, 22a, each of which opens rightward, has a U-like shape, and is set apart from the other in the upward-downward direction, are provided at a right end portion of the lens attachment portion 22, and a second support shaft 22b protruding forward is provided on the lens attachment portion 22 in a position close to the right end thereof.

A lens 24 is accommodated in a left end portion of the lens attachment portion 22. Instead of the lens 24, a CCD (charge coupled device), a CMOS (complementary metal oxide semiconductor) device, or any other suitable imaging device may be accommodated in the lens attachment portion 22.

A second shaft receiving section 23a, which opens leftward and has a U-like shape, is provided at a left end portion of the magnet attachment portion 23. A second magnet 25 is attached to the magnet attachment portion 23.

With the second support shaft 22b provided on the lens attachment portion 22 inserted backward into the support hole 18a formed through the support portion 18 of the first driven unit 3, the second driven unit 4 is pivotally supported by the first driven unit 3 around the second support shaft 22b.

Figure 7:
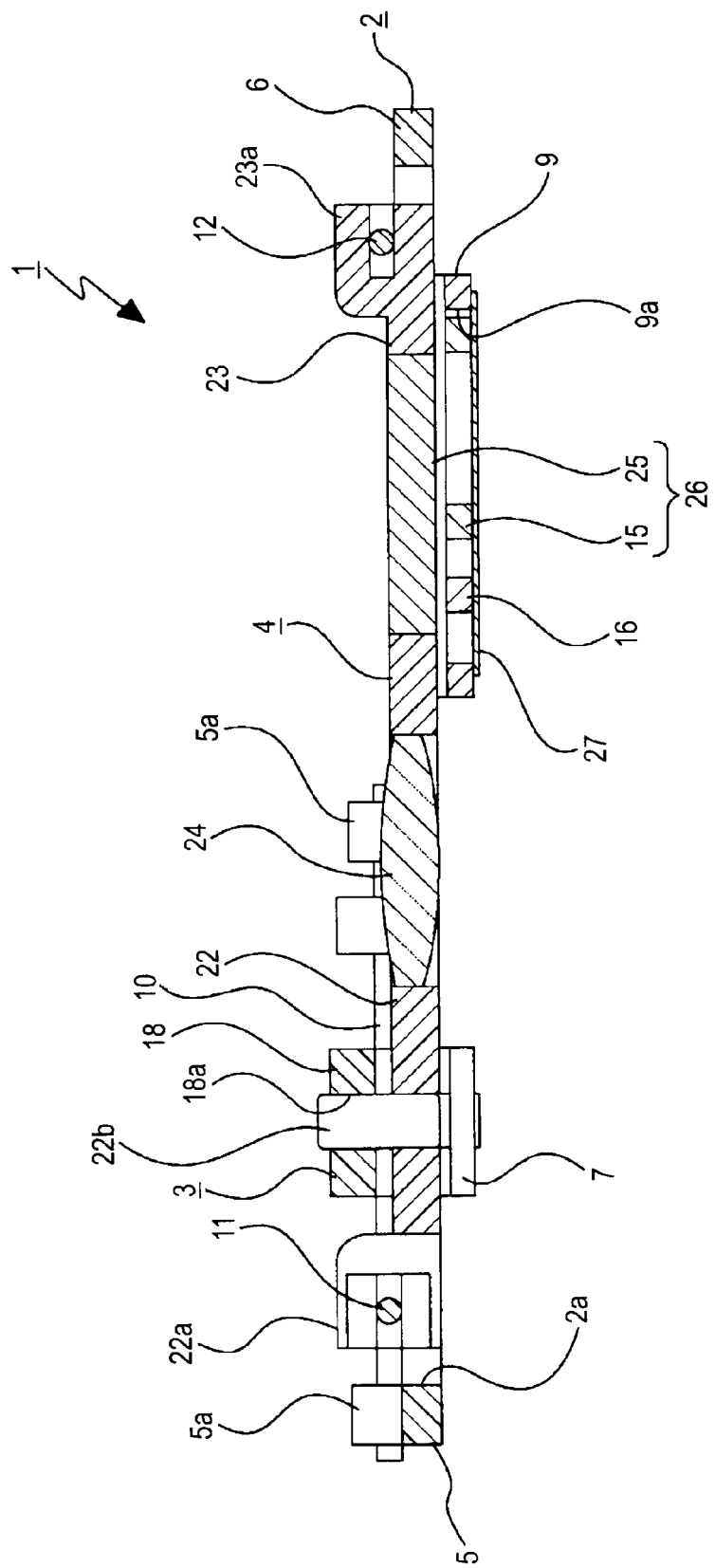
FIG. 7 is a cross-sectional view taken along the line VII-VII shown in FIG. 5.

With the second driven unit 4 pivotally supported by the first driven unit 3, the first shaft receiving sections 22a, 22a are slidably supported by the second guide shaft 11, the second shaft receiving section 23a is slidably supported by the third guide shaft 12, and the second magnet 25 is positioned in front of and faces the second drive coil 15 and the second detection device 16 (see FIG. 7). The support portion 18 of the first driven unit 3 is positioned in front of the lens attachment portion 22 of the second driven unit 4, and the lens 24 is located in the position corresponding to the opening 2a formed through the fixed member 2.

The second magnet 25 and the second drive coil 15 form a second actuator 26 that pivots the second driven unit 4 around the second support shaft 22b.

A flexible printed wiring board 27 is attached to the backside of the fixed member 2. The first drive coil 13, the first detection device 14, the second drive coil 15, and the second detection device 16 are mounted on the front side of the flexible printed wiring board 27. Attaching the flexible printed wiring board 27 to the backside of the fixed member 2 therefore allows the first drive coil 13 and the first detection device 14 to be disposed in the placement hole 8a formed through the first coil attachment portion 8 and the second drive coil 15 and the second detection device 16 to be disposed in the placement hole 9a formed through the second coil attachment portion 9.

The image blur correction apparatus 1 is configured as described above. Now, consider a first line L1 extending in the direction determined by connecting the center of the first support shaft 7a, around which the first driven unit 3 pivots, to the center of the second support shaft 22b, around which the second driven unit 4 pivots, and a second line L2 extending in the direction determined by connecting the center of the second support shaft 22b to the center of the lens 24. The first line L1 extends in the upward-downward direction, and the second line L2 extends in the rightward-leftward direction (see FIG. 5).

The first line L1 and the second line L2 are perpendicular to each other and intersect each other at the center of the second support shaft 22b. A substantially central portion of the first actuator 21 is present on the first line L1, and a substantially central portion of the second actuator 26 is present on the second line L2. Further, the first detection device 14 is positioned on the first line L1, and the second detection device 16 is positioned on the second line L2.

[Operation of Image Blur Correction Apparatus]

In the thus configured image blur correction apparatus 1, when a current is supplied to the first drive coil 13, the first actuator 21 produces a leftward or rightward thrust force in accordance with the relationship between the first magnet 20 and the direction of the supplied current, and the produced thrust force is applied to the first driven unit 3. When the leftward or rightward thrust force is applied to the first driven unit 3, the first driven unit 3 is pivoted relative to the fixed member 2 around the first support shaft 7a in a direction perpendicular to the optical axis direction, and the second driven unit 4 is moved substantially in the rightward-leftward direction (direction R1 shown in FIGS. 5, 8, and 9).

Further, when a current is supplied to the second drive coil 15, the second actuator 26 produces an upward or downward thrust force in accordance with the relationship between the second magnet 25 and the direction of the supplied current, and the produced thrust force is applied to the second driven unit 4. When the upward or downward thrust force is applied to the second driven unit 4, the second driven unit 4 is pivoted relative to the first driven unit 3 around the second support shaft 22b in a direction perpendicular to the optical axis direction, and the second driven unit 4 is moved substantially in the upward-downward direction (direction R2 shown in FIGS. 5, 8, and 9).

Figure 8:
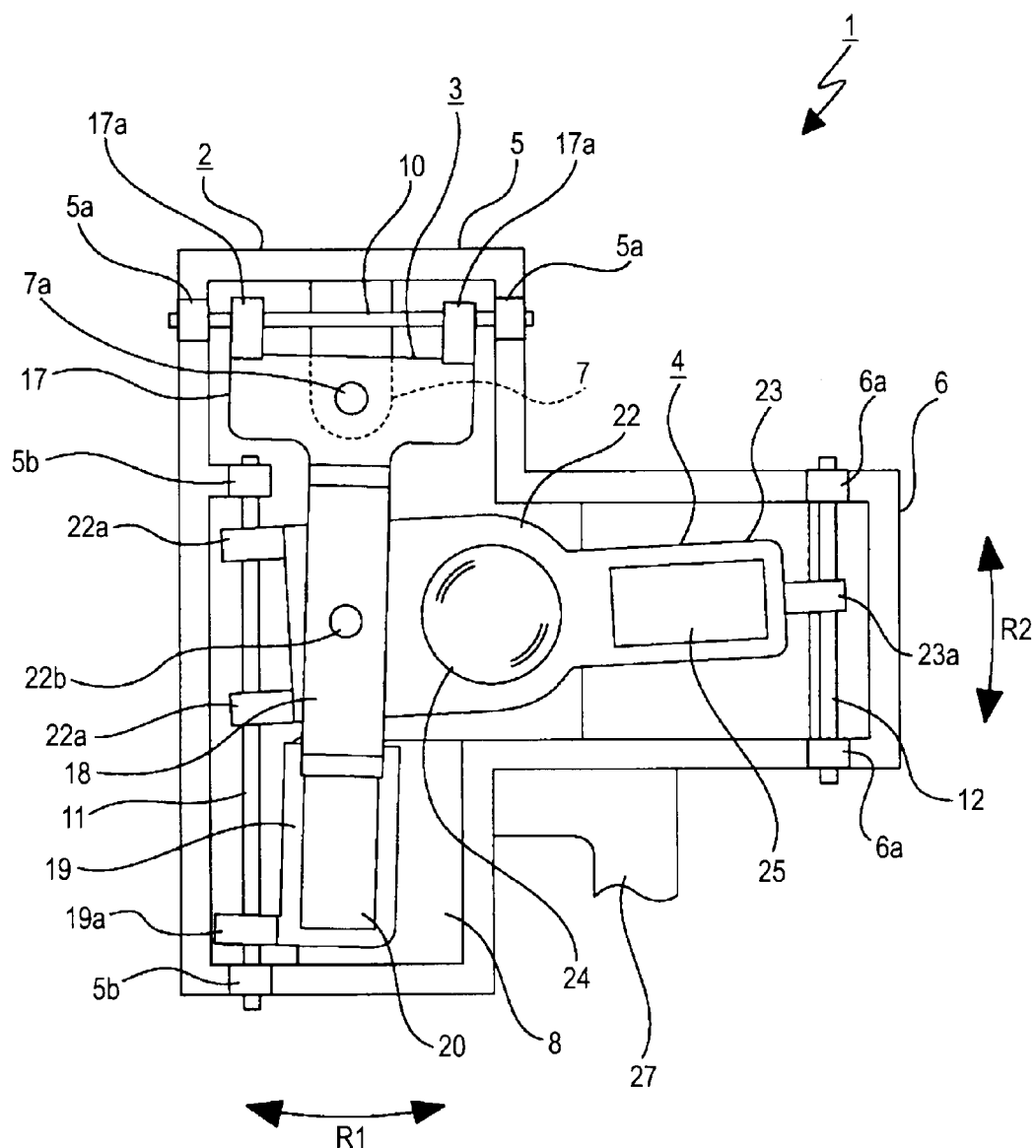
FIG. 8 is an enlarged front view showing a state in which first and second driven units are driven.
Figure 9:
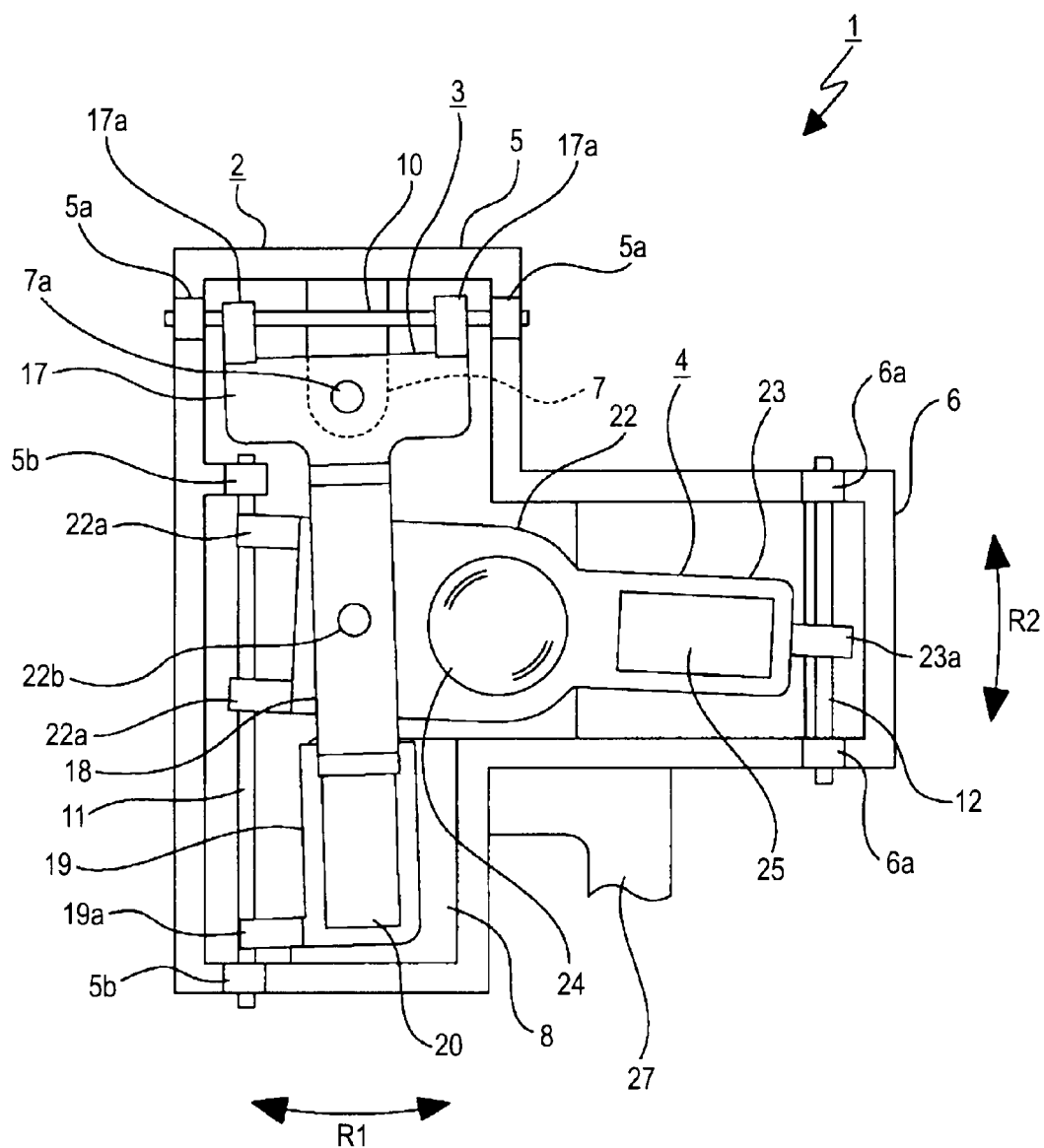
FIG. 9 is an enlarged front view showing a state in which the first and second driven units are driven in a direction different from that in FIG. 8.
Figure 10:
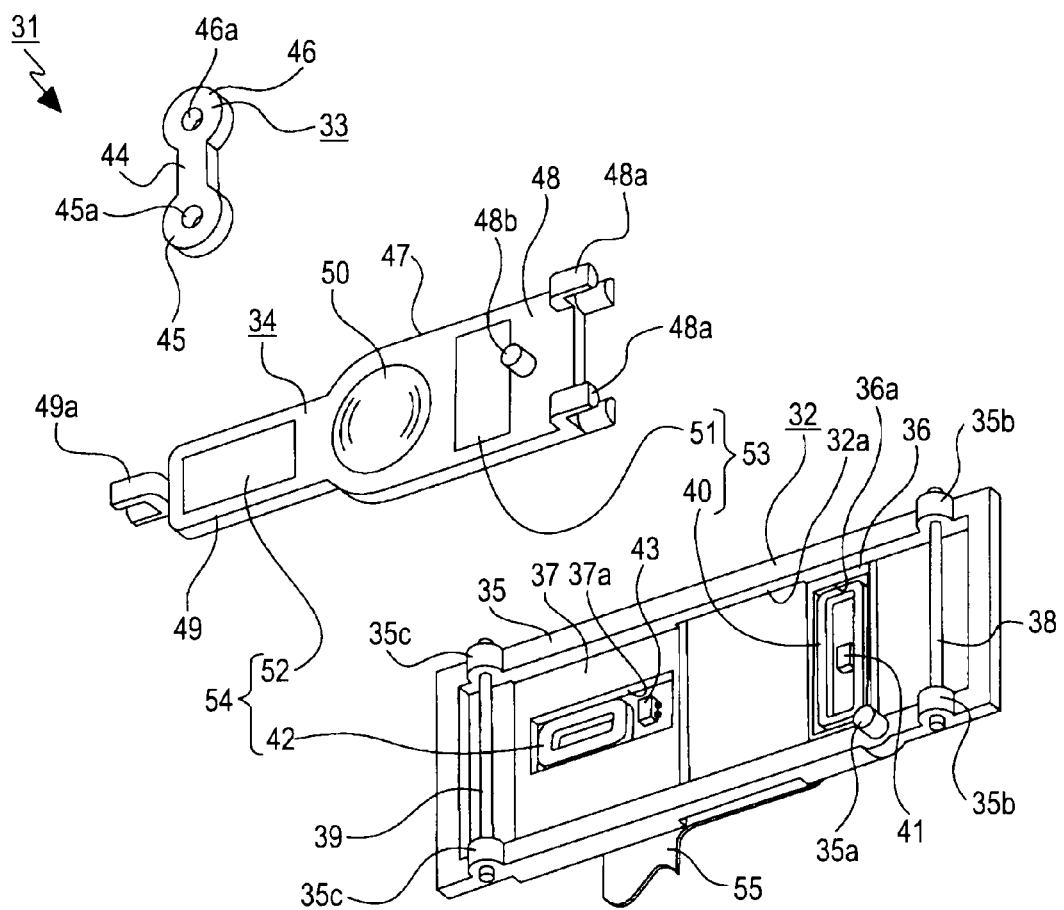
FIG. 10 along with FIGS. 11 to 19 shows an image blur correction apparatus according to a second embodiment of the invention and is an exploded perspective view.
Figure 11:
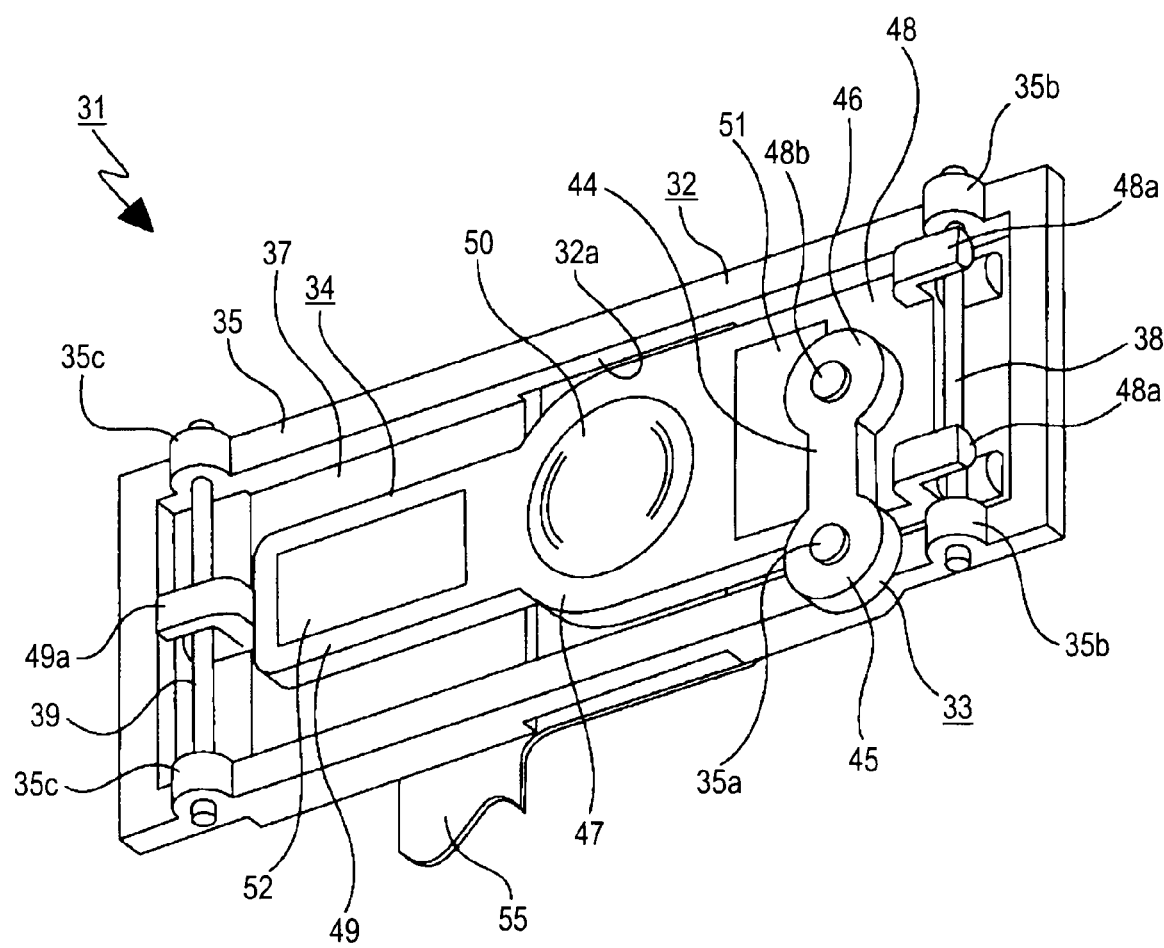
FIG. 11 is an enlarged perspective view.
Figure 12:
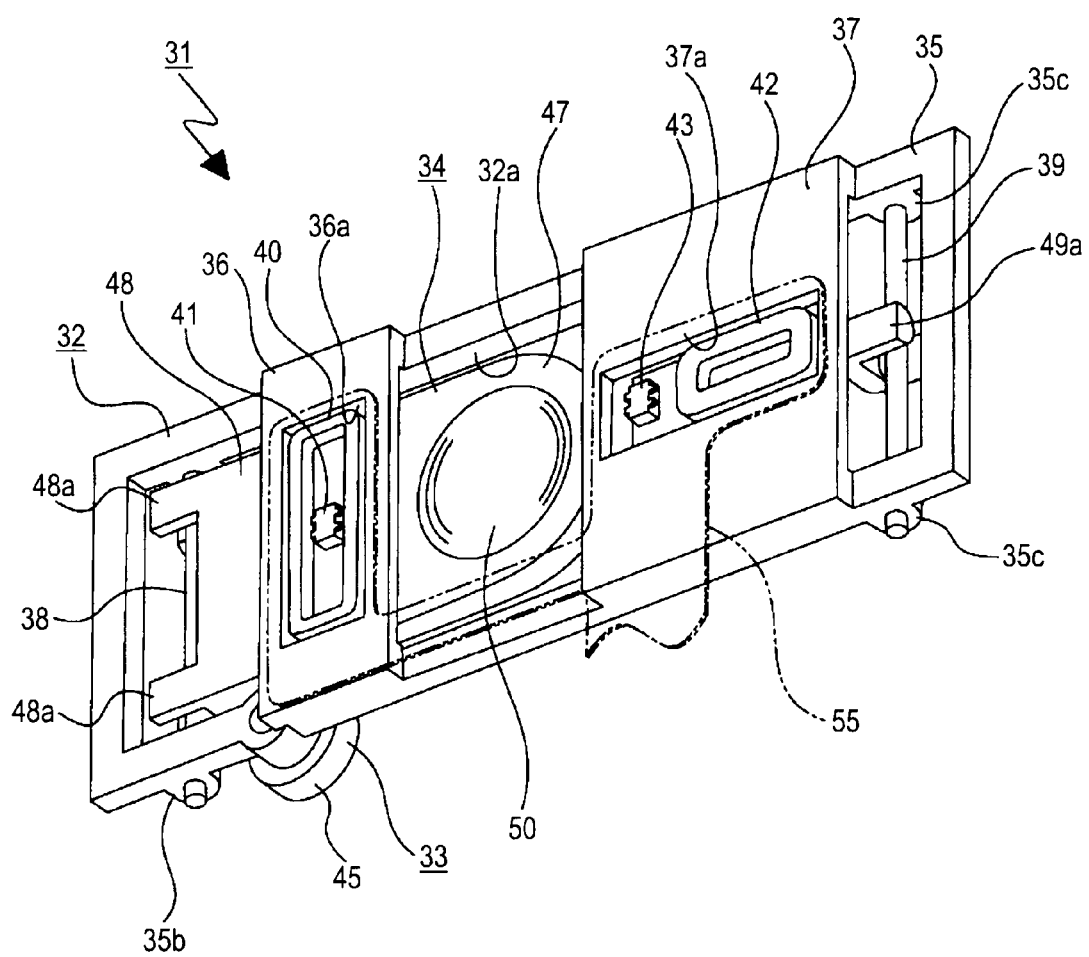
FIG. 12 is an enlarged perspective view showing the image blur correction apparatus viewed in a direction different from that in FIG. 11.
Figure 13:
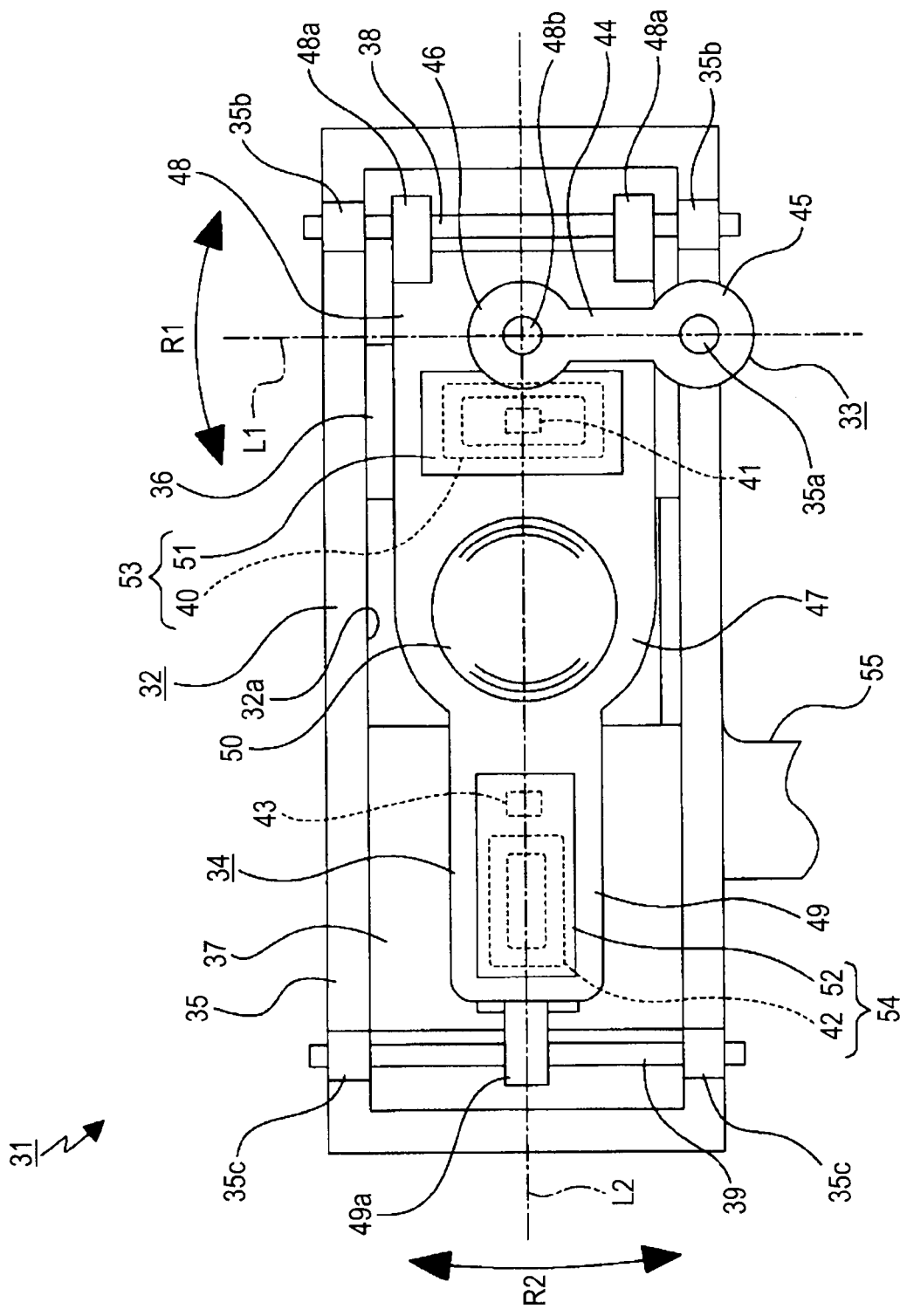
FIG. 13 is an enlarged front view.

For example, when the first actuator 21 applies a rightward thrust force to the first driven unit 3, and the second actuator 26 applies an upward thrust force to the second driven unit 4, the lens 24 or the imaging device is moved upward but obliquely rightward as shown in FIG. 8. Alternatively, for example, when the first actuator 21 applies a leftward thrust force to the first driven unit 3, and the second actuator 26 applies a downward thrust force to the second driven unit 4, the lens 24 or the imaging device is moved downward but obliquely leftward as shown in FIG. 9.

When the first driven unit 3 and the second driven unit 4 are pivoted, the first detection device 14 detects the position of the first driven unit 3 in the rightward-leftward direction (first direction), and the second detection device 16 detects the position of the second driven unit 4 in the upward-downward direction (second direction). The position to which the lens 24 or the imaging device has been moved in a plane perpendicular to the optical axis direction is calculated based on the position of the first driven unit 3 detected by the first detection device 14 and the position of the second driven unit 4 detected by the second detection device 16.

As described above, a magnetic detection device is, for example, used as the first detection device 14 and the second detection device 16, and the positions of the first driven unit 3 and the second driven unit 4 are detected based on the change in magnetic flux produced by the first magnet 20 and the second magnet 25. The first magnet 20 and the second magnet 25 therefore not only function as components of the first actuator 21 and the second actuator 26 but also function as detection magnets for the first detection device 14 and the second detection device 16, respectively.

Since the first magnet 20 and the second magnet 25 function as not only the drive magnets for driving the first driven unit 3 and the second driven unit 4 but also the detection magnets for detecting the positions of the first driven unit 3 and the second driven unit 4 as described above, the number of parts and hence the manufacturing cost can be reduced.

As described above, image blur is corrected by pivoting the second driven unit 4, which holds the lens 24 or the imaging device, in the R1 and R2 directions in a plane perpendicular to the optical axis direction.

In the image blur correction apparatus 1, since a substantially central portion of the first actuator 21 is present on the first line L1 and a substantially central portion of the second actuator 26 is present on the second line L2 as described above, the lens 24 or the imaging device can be driven more efficiently.

Further, since the first detection device 14 is disposed on the first line L1 and the second detection device 16 is disposed on the second line L2, the positions of the first driven unit 3 and the second driven unit 4 can be detected more precisely.

<Second Embodiment>

A second embodiment of the image blur correction apparatus will be described below (see FIGS. 10 to 14).

An image blur correction apparatus 31 includes a fixed member 32, a first driven unit 33, and a second driven unit 34 (see FIGS. 10 to 13).

The fixed member 32 includes a horizontally elongated, rectangular frame 35 and has an opening 32a in a central portion in the rightward-leftward direction.

A first support shaft 35a protruding forward is provided on a lower end portion of the frame 35. First shaft holding sections 35b, 35b set apart from each other in the upward-downward direction are provided on the frame 35 in positions close to the left end thereof, and second shaft holding sections 35c, 35c set apart from each other in the upward-downward direction are provided on the frame 35 in positions close to the right end thereof.

A first plate-shaped coil attachment portion 36 and a second plate-shaped coil attachment portion 37 oriented in the forward-backward direction are provided in the fixed member 32 on the left and right sides of the opening 32a. A placement hole 36a is formed through the first coil attachment portion 36, and a placement hole 37a is formed through the second coil attachment portion 37.

A first guide shaft 38 is attached between the first shaft holding sections 35b, 35b of the frame 35, and a second guide shaft 39 is attached between the second shaft holding sections 35c, 35c of the frame 35.

A first drive coil 40 and a first detection device 41 are disposed in the placement hole 36a formed through the first coil attachment portion 36, and the first detection device 41 is disposed in a central portion of the first drive coil 40. A second drive coil 42 and a second detection device 43 are disposed side by side in the rightward-leftward direction in the placement hole 37a formed through the second coil attachment portion 37. Each of the first detection device 41 and the second detection device 43 is, for example, a magnetic detection device.

The first driven unit 33 is formed of a connecting portion 44 extending in the upward-downward direction and forming a middle portion, a supported portion 45 connected to the lower end of the connecting portion 44, and a support portion 46 connected to the upper end of the connecting portion 44.

The supported portion 45 has a supported hole 45a formed therethrough in the forward-backward direction.

The support portion 46 has a support hole 46a formed therethrough in the forward-backward direction.

With the first support shaft 35a provided on the frame 35 of the fixed member 32 inserted forward into the supported hole 45a formed through the supported portion 45, the first driven unit 33 is pivotally supported by the fixed member 32 around the first support shaft 35a.

The second driven unit 34 is so shaped that it extends in the rightward-leftward direction and is formed of a lens attachment portion 47 positioned in a central portion in the rightward-leftward direction, a first magnet attachment portion 48 connected to the left end of the lens attachment portion 47, and a second magnet attachment portion 49 connected to the right end of the lens attachment portion 47.

A lens 50 is accommodated in the lens attachment portion 47. Instead of the lens 50, a CCD, a CMOS device, or any other suitable imaging device may be accommodated in the lens attachment portion 47.

First shaft receiving sections 48*a*, 48*a*, each of which opens leftward, has a U-like shape, and is set apart from the other in the upward-downward direction, are provided at a left end portion of the first magnet attachment portion 48. A second support shaft 48*b* protruding forward is provided on the first magnet attachment portion 48. A first magnet 51 is attached to the first magnet attachment portion 48.

A second shaft receiving section 49*a*, which opens rightward and has a U-like shape, is provided at a right end portion of the second magnet attachment portion 49. A second magnet 52 is attached to the second magnet attachment portion 49.

With the second support shaft 48*b* provided on the first magnet attachment portion 48 inserted backward into the support hole 46*a* formed through the support portion 46 of the first driven unit 33, the second driven unit 34 is pivotally supported by the first driven unit 33 around the second support shaft 48*b*.

With the second driven unit 34 pivotally supported by the first driven unit 33, the first shaft receiving sections 48*a*, 48*a* are slidably supported by the first guide shaft 38, and the second shaft receiving section 49*a* is slidably supported by the second guide shaft 39. The first magnet 51 is positioned in front of and faces the first drive coil 40 and the first detection device 41, and the second magnet 52 is positioned in front of and faces the second drive coil 42 and the second detection device 43.

The first magnet 51 and the first drive coil 40 form a first actuator 53 that pivots the first driven unit 33 around the first support shaft 35*a*. The second magnet 52 and the second drive coil 42 form a second actuator 54 that pivots the second driven unit 34 around the second support shaft 48*b*.

A flexible printed wiring board 55 is attached to the backside of the fixed member 32. The first drive coil 40, the first detection device 41, the second drive coil 42, and the second detection device 43 are mounted on the front side of the flexible printed wiring board 55. Attaching the flexible printed wiring board 55 to the backside of the fixed member 32 therefore allows the first drive coil 40 and the first detection device 41 to be disposed in the placement hole 36*a* formed through the first coil attachment portion 36 and the second drive coil 42 and the second detection device 43 to be disposed in the placement hole 37*a* formed through the second coil attachment portion 37.

The image blur correction apparatus 31 is configured as described above. Now, consider a first line L1 extending in the direction determined by connecting the center of the first support shaft 35*a*, around which the first driven unit 33 pivots, to the center of the second support shaft 48*b*, around which the second driven unit 34 pivots, and a second line L2 extending in the direction determined by connecting the center of the second support shaft 48*b* to the center of the lens 50. The first line L1 extends in the upward-downward direction, and the second line L2 extends in the rightward-leftward direction (see FIG. 13).

The first line L1 and the second line L2 are perpendicular to each other and intersect each other at the center of the second support shaft 48*b*. A substantially central portion of the first actuator 53 and a substantially central portion of the second actuator 54 are present on the second line L2. Further, the first detection device 41 and the second detection device 43 are positioned on the second line L2.

[Operation of Image Blur Correction Apparatus]

In the thus configured image blur correction apparatus 31, when a current is supplied to the first drive coil 40, the first actuator 53 produces a leftward or rightward thrust force in accordance with the relationship between the first magnet 51 and the direction of the supplied current, and the produced thrust force is applied to the first driven unit 33. When the leftward or rightward thrust force is applied to the first driven unit 33, the first driven unit 33 is pivoted relative to the fixed member 32 around the first support shaft 35*a* in a direction perpendicular to the optical axis direction, and the second driven unit 34 is moved substantially in the rightward-leftward direction (direction R1 shown in FIGS. 13 to 15).

When a current is supplied to the second drive coil 42, the second actuator 54 produces an upward or downward thrust force in accordance with the relationship between the second magnet 52 and the direction of the supplied current, and the produced thrust force is applied to the second driven unit 34. When the upward or downward thrust force is applied to the second driven unit 34, the second driven unit 34 is pivoted relative to the first driven unit 33 around the second support shaft 48*b* in a direction perpendicular to the optical axis direction, and the second driven unit 34 is moved substantially in the upward-downward direction (direction R2 shown in FIGS. 13 to 15).

Figure 14:
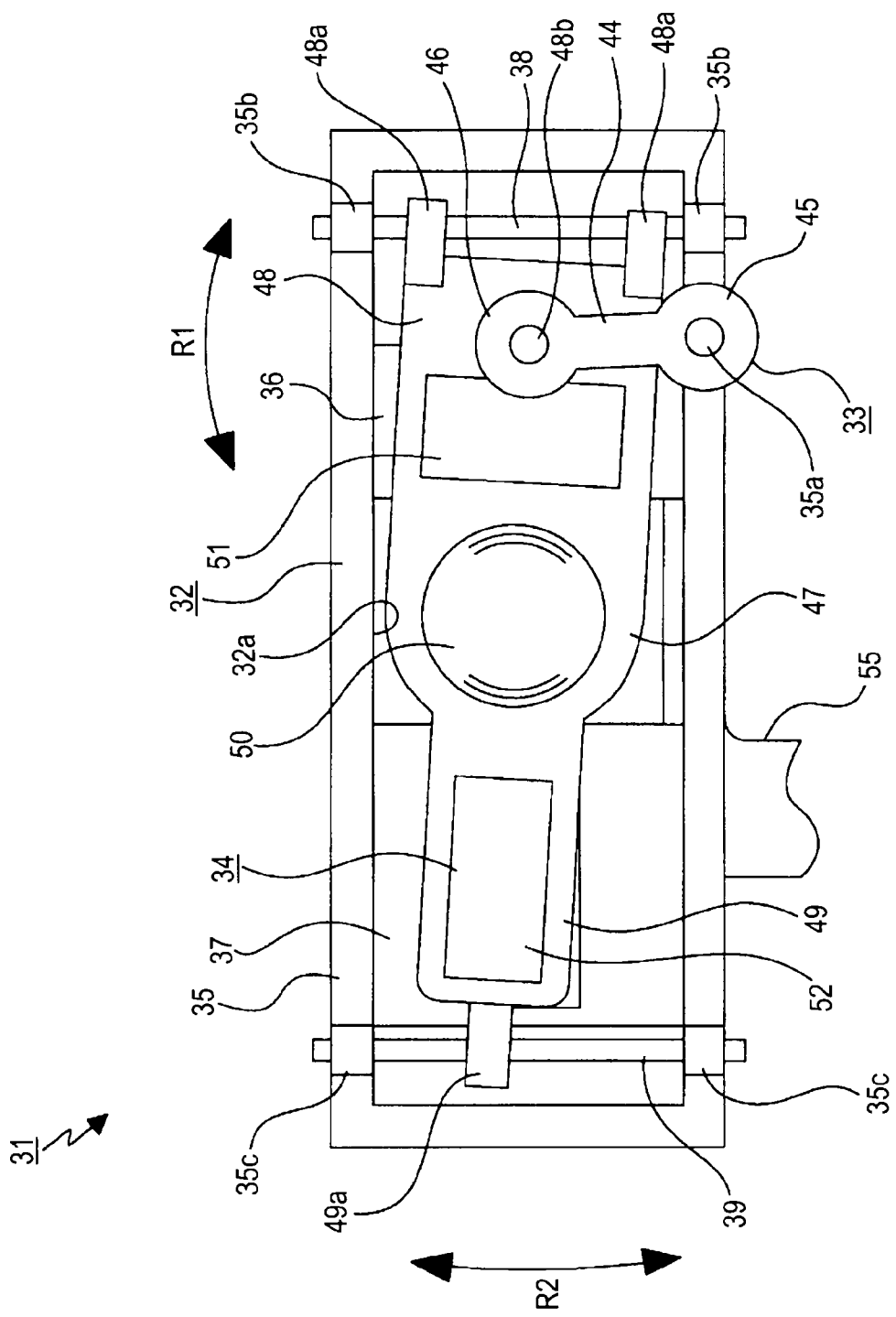
FIG. 14 is an enlarged front view showing a state in which first and second driven units are driven.
Figure 15:
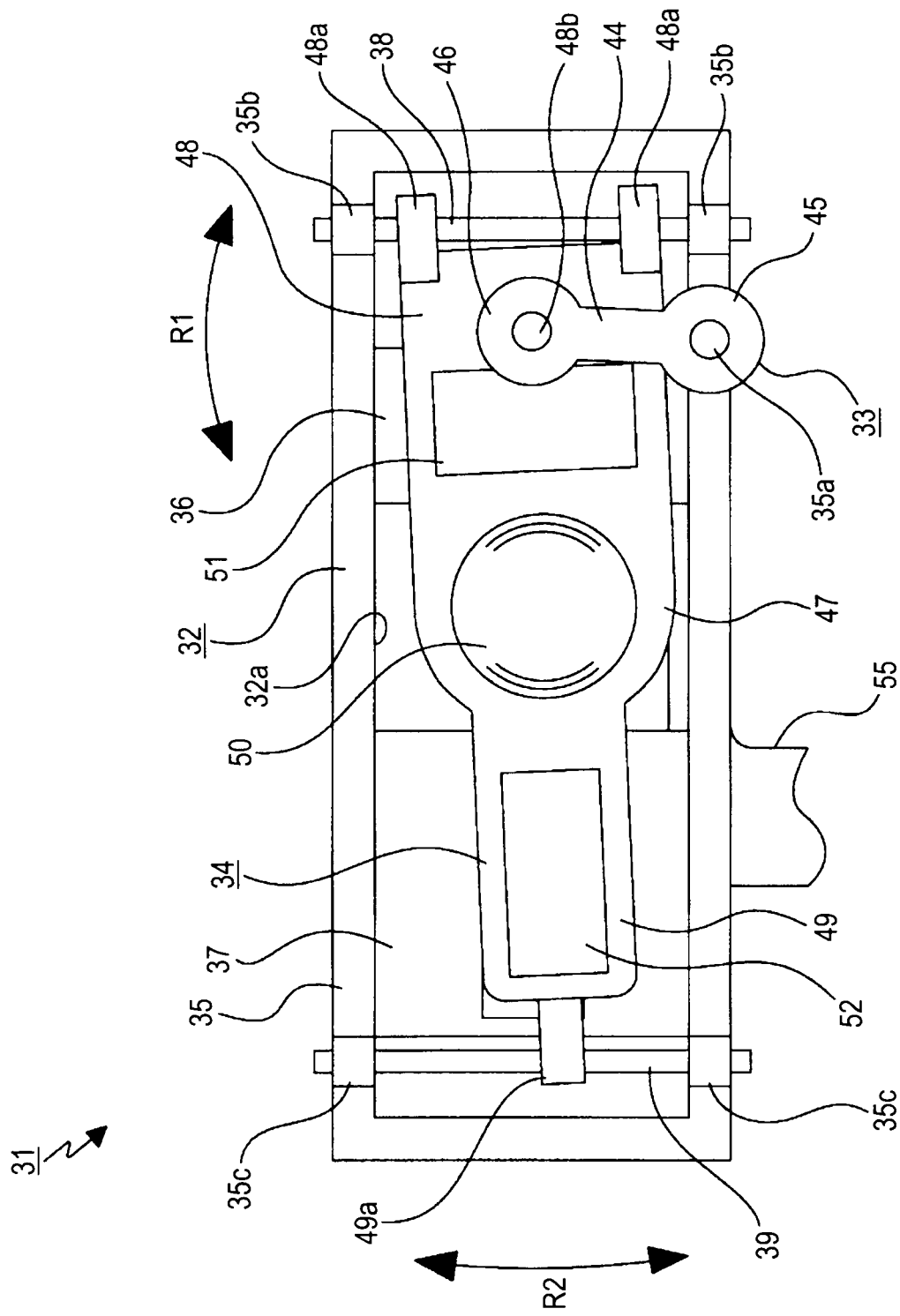
FIG. 15 is an enlarged front view showing a state in which the first and second driven units are driven in a direction different from that in FIG. 14.
Figure 16:
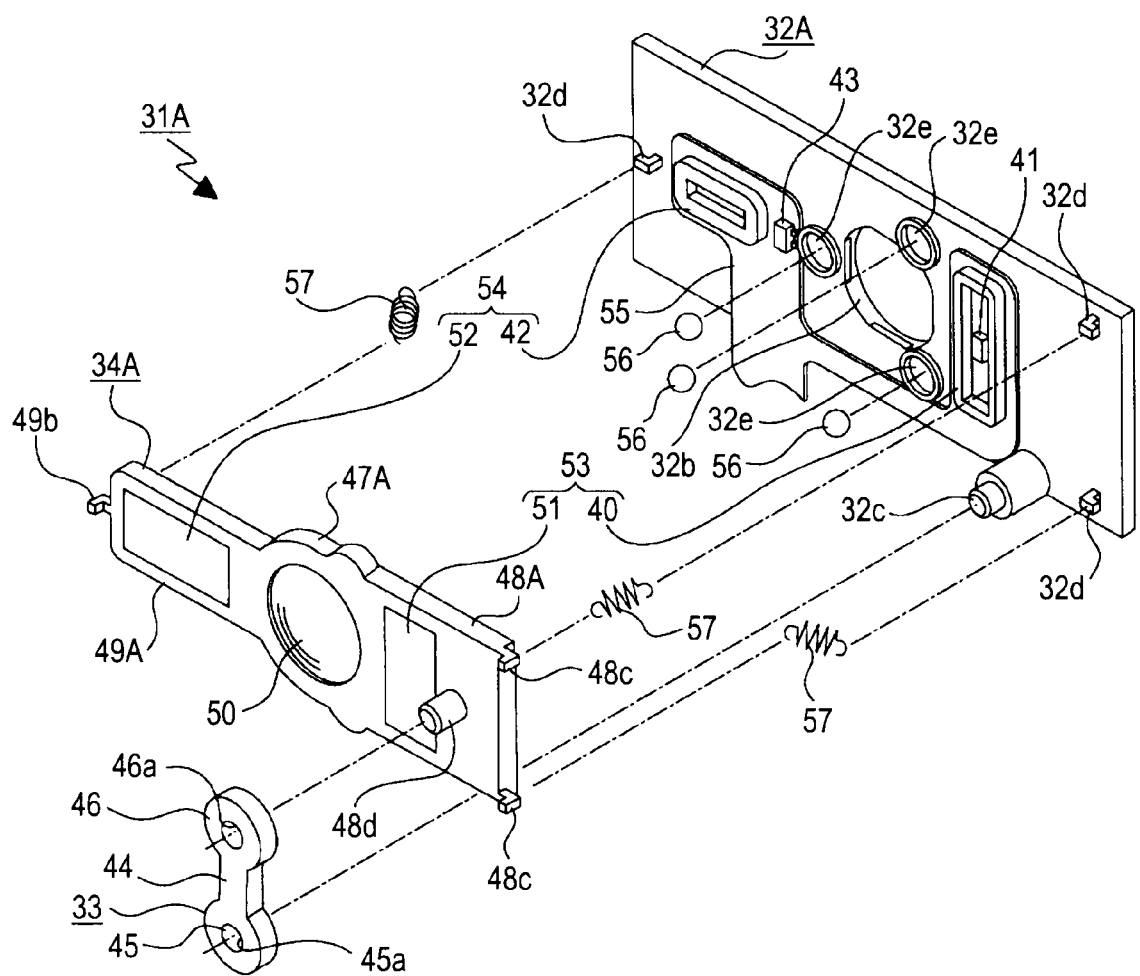
FIG. 16 along with FIGS. 17 to 19 shows a variation in the second embodiment and is an exploded perspective view.
Figure 17:
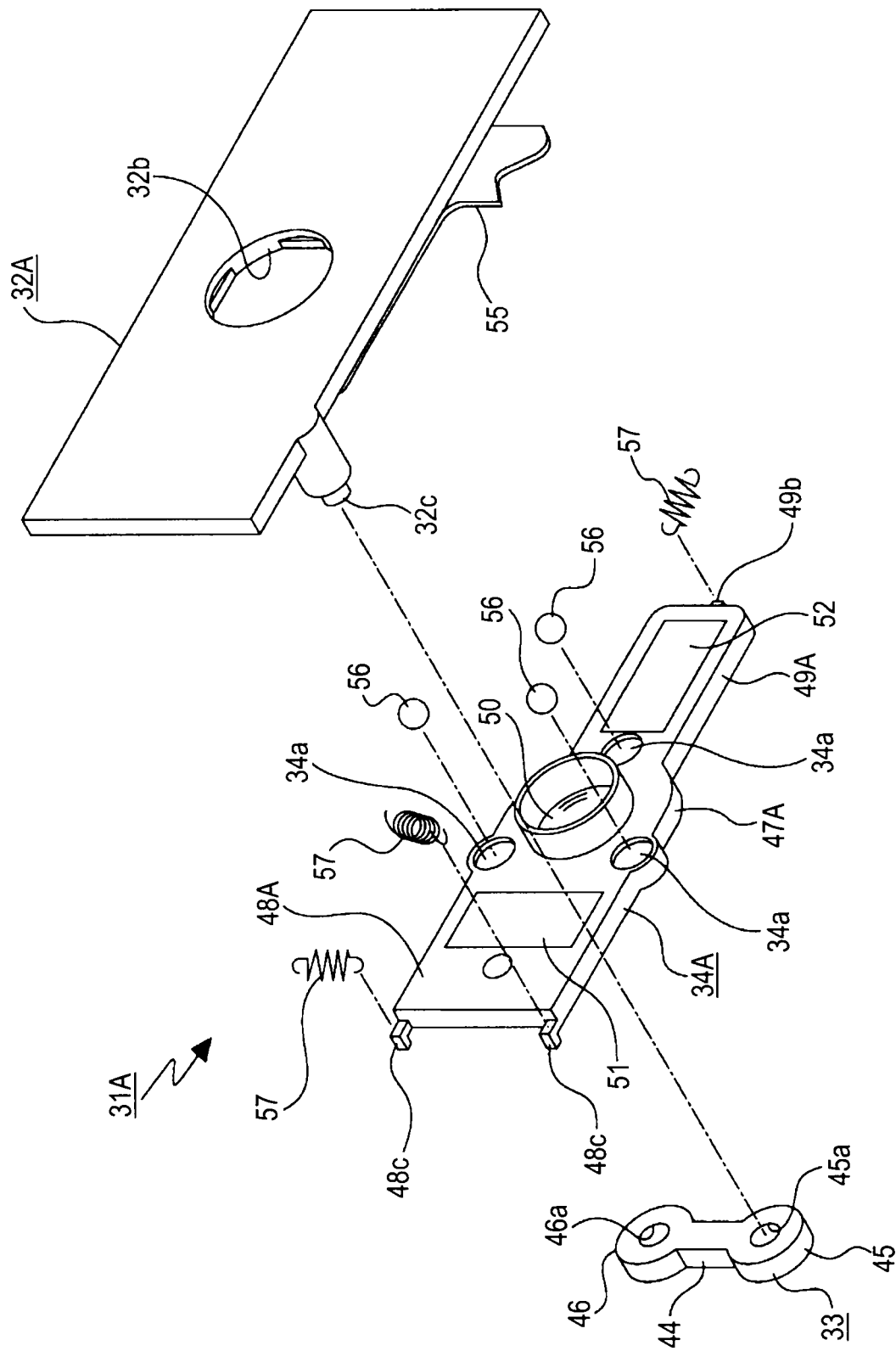
FIG. 17 is an exploded perspective view showing the variation viewed in a direction different from that in FIG. 16.
Figure 18:
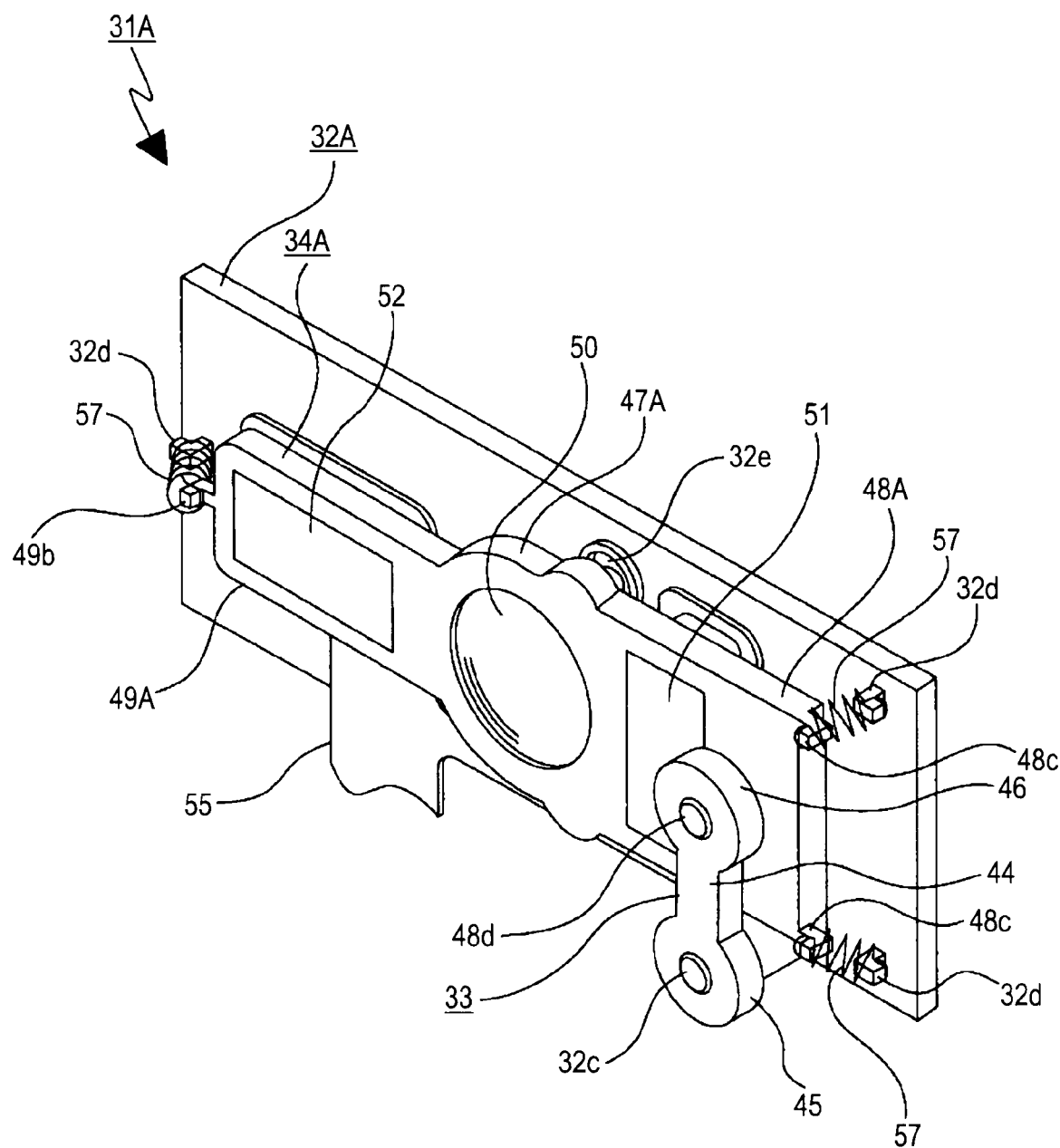
FIG. 18 is an enlarged perspective view.
Figure 19:
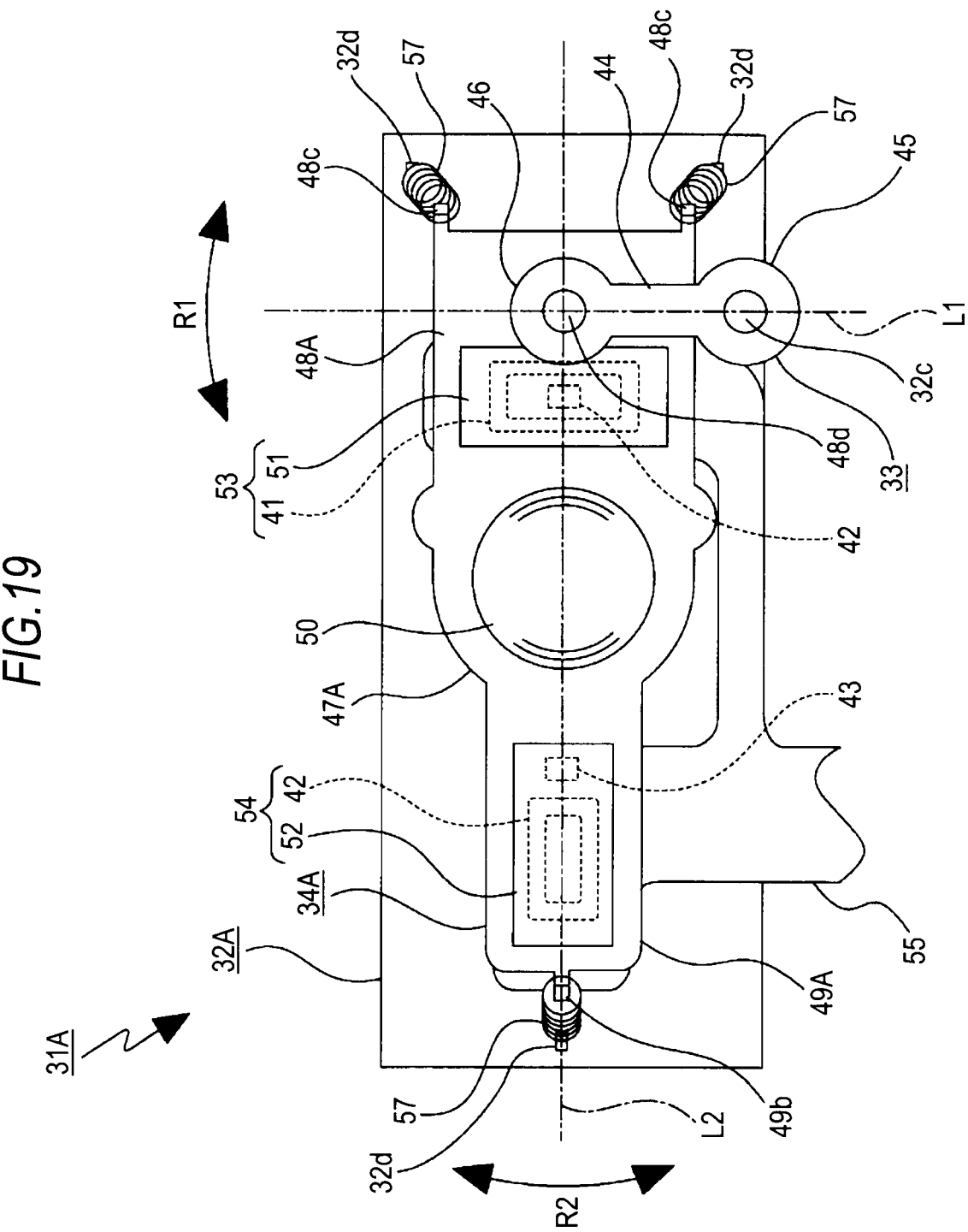
FIG. 19 is an enlarged front view.

For example, when the first actuator 53 applies a rightward thrust force to the first driven unit 33, and the second actuator 54 applies an upward thrust force to the second driven unit 34, the lens 50 or the imaging device is moved upward but obliquely rightward as shown in FIG. 14. Alternatively, for example, when the first actuator 53 applies a leftward thrust force to the first driven unit 33, and the second actuator 54 applies a downward thrust force to the second driven unit 34, the lens 50 or the imaging device is moved downward but obliquely leftward as shown in FIG. 15.

When the first driven unit 33 and the second driven unit 34 are pivoted, the first detection device 41 detects the position of the second driven unit 34 in the rightward-leftward direction (first direction), and the second detection device 43 detects the position of the second driven unit 34 in the upward-downward direction (second direction). The position to which the lens 50 or the imaging device has been moved in a plane perpendicular to the optical axis direction is calculated based on the position of the second driven unit 34 detected by the first detection device 41 and the position of the second driven unit 34 detected by the second detection device 43.

As described above, a magnetic detection device is, for example, used as the first detection device 41 and the second detection device 43, and the positions of the first driven unit 33 and the second driven unit 34 are detected based on the change in magnetic flux produced by the first magnet 51 and the second magnet 52. The first magnet 51 and the second magnet 52 therefore not only function as components of the first actuator 53 and the second actuator 54 but also function as detection magnets for the first detection device 41 and the second detection device 43, respectively.

Since the first magnet 51 and the second magnet 52 function as not only the drive magnets for driving the first driven unit 33 and the second driven unit 34 but also the detection magnets for detecting the positions of the first driven unit 33 and the second driven unit 34 as described above, the number of parts and hence the manufacturing cost can be reduced.

As described above, image blur is corrected by pivoting the second driven unit 34, which holds the lens 50 or the imaging device, in the R1 and R2 directions in a plane perpendicular to the optical axis direction.

In the image blur correction apparatus 31, since a substantially central portion of the first actuator 53 and a substantially central portion of the second actuator 54 are present on the second line L2 as described above, the lens 50 or the imaging device can be driven more efficiently.

Further, since the first detection device 41 and the second detection device 43 are disposed on the second line L2, the positions of the first driven unit 33 and the second driven unit 34 can be detected more precisely.

Moreover, since the second driven unit 34 is supported by the first guide shaft 38 and the second guide shaft 39, and no guide shaft for supporting the first driven unit 33 is necessary, the number of parts can be reduced and the mechanism can be simplified accordingly.

<Variation>

A variation of the image blur correction apparatus 31 in the second embodiment will be described below (see FIGS. 16 to 19).

An image blur correction apparatus 31A, which is a variation and will be described below, only differs from the image blur correction apparatus 31 described above in that the second driven unit is not supported by guide shafts but is supported by support springs and spheres. The following description about the image blur correction apparatus 31A will therefore be made in detail only of the portions different from those in the image blur correction apparatus 31. The other portions that are the same as those in the image blur correction apparatus 31 have the same reference characters, and no description of these portions will be made.

The image blur correction apparatus 31A includes a fixed member 32A, a first driven unit 33, and a second driven unit 34A.

The fixed member 32A has a horizontally elongated, rectangular plate-like shape and has an opening 32b in a substantially central portion.

A first support shaft 32c protruding forward is provided on a lower end portion of the fixed member 32A. Spring hooking protrusions 32d, 32d, 32d are provided along an outer peripheral portion on the front side of the fixed member 32A. Sphere support sections 32e, 32e, 32e, each of which opens forward and has a concave shape, are formed on the front side of the fixed member 32A in positions located around the opening 32b and set apart from each other in the circumferential direction.

With the first support shaft 32c provided on the fixed member 32A inserted forward into a supported hole 45a formed through a supported portion 45, the first driven unit 33 is pivotally supported by the fixed member 32A around the first support shaft 32c.

The second driven unit 34A is so shaped that it extends in the rightward-leftward direction and is formed of a lens attachment portion 47A positioned in a central portion in the rightward-leftward direction, a first magnet attachment portion 48A connected to the left end of the lens attachment portion 47A, and a second magnet attachment portion 49A connected to the right end of the lens attachment portion 47A.

A lens 50 is accommodated in the lens attachment portion 47A. Instead of the lens 50, a CCD, a CMOS device, or any other suitable imaging device may be accommodated in the lens attachment portion 47A.

Spring hooking pieces 48c, 48c set apart from each other in the upward-downward direction are provided at a left end portion of the first magnet attachment portion 48A. A second support shaft 48d protruding forward is provided on the first magnet attachment portion 48A. A first magnet 51 is attached to the first magnet attachment portion 48A.

A spring hooking piece 49b is provided at a right end portion of the second magnet attachment portion 49A. A second magnet 52 is attached to the second magnet attachment portion 49A.

Concave sphere receiving sections 34a, 34a, 34a are formed in the backside of the second driven unit 34A, and the sphere receiving sections 34a, 34a, 34a are positioned around the lens 50 and set apart from each other in the circumferential direction.

With the second support shaft 48d provided on the first magnet attachment portion 48A inserted backward into a support hole 46a formed through a support portion 46 of the first driven unit 33, the second driven unit 34A is pivotally supported by the first driven unit 33 around the second support shaft 48d.

A flexible printed wiring board 55 is attached to the front side of the fixed member 32A.

With the second driven unit 34A pivotally supported by the first driven unit 33, spheres 56, 56, 56 are disposed between the sphere support sections 32e, 32e, 32e formed on the fixed member 32A and the sphere receiving sections 34a, 34a, 34a formed in the second driven unit 34A. Further, with the second driven unit 34A pivotally supported by the first driven unit 33, support springs 57, 57, 57, which are compression coil springs, are attached between the spring hooking protrusions 32d, 32d, 32d of the fixed member 32A and the spring hooking pieces 48c, 48c, 49b of the second driven unit 34A.

The urging force produced by the support springs 57, 57, 57 presses the second driven unit 34A against the fixed member 32A with the spheres 56, 56, 56 therebetween, and the second driven unit 34A can move relative to the fixed member 32A in a plane perpendicular to the optical axis direction because the spheres 56, 56, 56 can roll.

With the second driven unit 34A pivotally supported by the first driven unit 33, the first magnet 51 is positioned in front of and faces a first drive coil 40 and a first detection device 41, and the second magnet 52 is positioned in front of and faces a second drive coil 42 and a second detection device 43.

The image blur correction apparatus 31A is configured as described above. Now, consider a first line L1 extending in the direction determined by connecting the center of the first support shaft 32c, around which the first driven unit 33 pivots, to the center of the second support shaft 48d, around which the second driven unit 34A pivots, and a second line L2 extending in the direction determined by connecting the center of the second support shaft 48d to the center of the lens 50. The first line L1 extends in the upward-downward direction, and the second line L2 extends in the rightward-leftward direction (see FIG. 19).

The first line L1 and the second line L2 are perpendicular to each other and intersect each other at the center of the second support shaft 48d. A substantially central portion of the first actuator 53 and a substantially central portion of the second actuator 54 are present on the second line L2. Further, the first detection device 41 and the second detection device 43 are positioned on the second line L2.

[Operation of Image Blur Correction Apparatus]

In the thus configured image blur correction apparatus 31A, when a current is supplied to the first drive coil 40, the first actuator 53 produces a leftward or rightward thrust force in accordance with the relationship between the first magnet 51 and the direction of the supplied current, and the produced thrust force is applied to the first driven unit 33. When the leftward or rightward thrust force is applied to the first driven unit 33, the first driven unit 33 is pivoted relative to the fixed member 32A around the first support shaft 32c in a direction perpendicular to the optical axis direction, and the second driven unit 34A is moved substantially in the rightward-leftward direction (direction R1 shown in FIG. 19).

When a current is supplied to the second drive coil 42, the second actuator 54 produces an upward or downward thrust force in accordance with the relationship between the second magnet 52 and the direction of the supplied current, and the produced thrust force is applied to the second driven unit 34A. When the upward or downward thrust force is applied to the second driven unit 34A, the second driven unit 34A is pivoted relative to the first driven unit 33 around the second support shaft 48d in a direction perpendicular to the optical axis direction, and the second driven unit 34A is moved substantially in the upward-downward direction (direction R2 shown in FIG. 19).

When the first driven unit 33 and the second driven unit 34A are pivoted, the first detection device 41 detects the position of the second driven unit 34A in the rightward-leftward direction (first direction), and the second detection device 43 detects the position of the second driven unit 34A in the upward-downward direction (second direction). The position to which the lens 50 or the imaging device has been moved in a plane perpendicular to the optical axis direction is calculated based on the position of the second driven unit 34 detected by the first detection device 41 and the position of the second driven unit 34A detected by the second detection device 43.

As described above, image blur is corrected by pivoting the second driven unit 34A, which holds the lens 50 or the imaging device, in the R1 and R2 directions in a plane perpendicular to the optical axis direction.

In the image blur correction apparatus 31A, since a substantially central portion of the first actuator 53 and a substantially central portion of the second actuator 54 are present on the second line L2 as described above, the lens 50 or the imaging device can be driven more efficiently.

Further, since the first detection device 41 and the second detection device 43 are disposed on the second line L2, the positions of the first driven unit 33 and the second driven unit 34A can be detected more precisely.

Moreover, the second driven unit 34A can be moved relative to the fixed member 32A in a simplified configuration in which the urging force produced by the support springs 57, 57, 57 presses the second driven unit 34A against the fixed member 32A with the spheres 56, 56, 56 therebetween.

[Imaging Apparatus]

Figure 20:
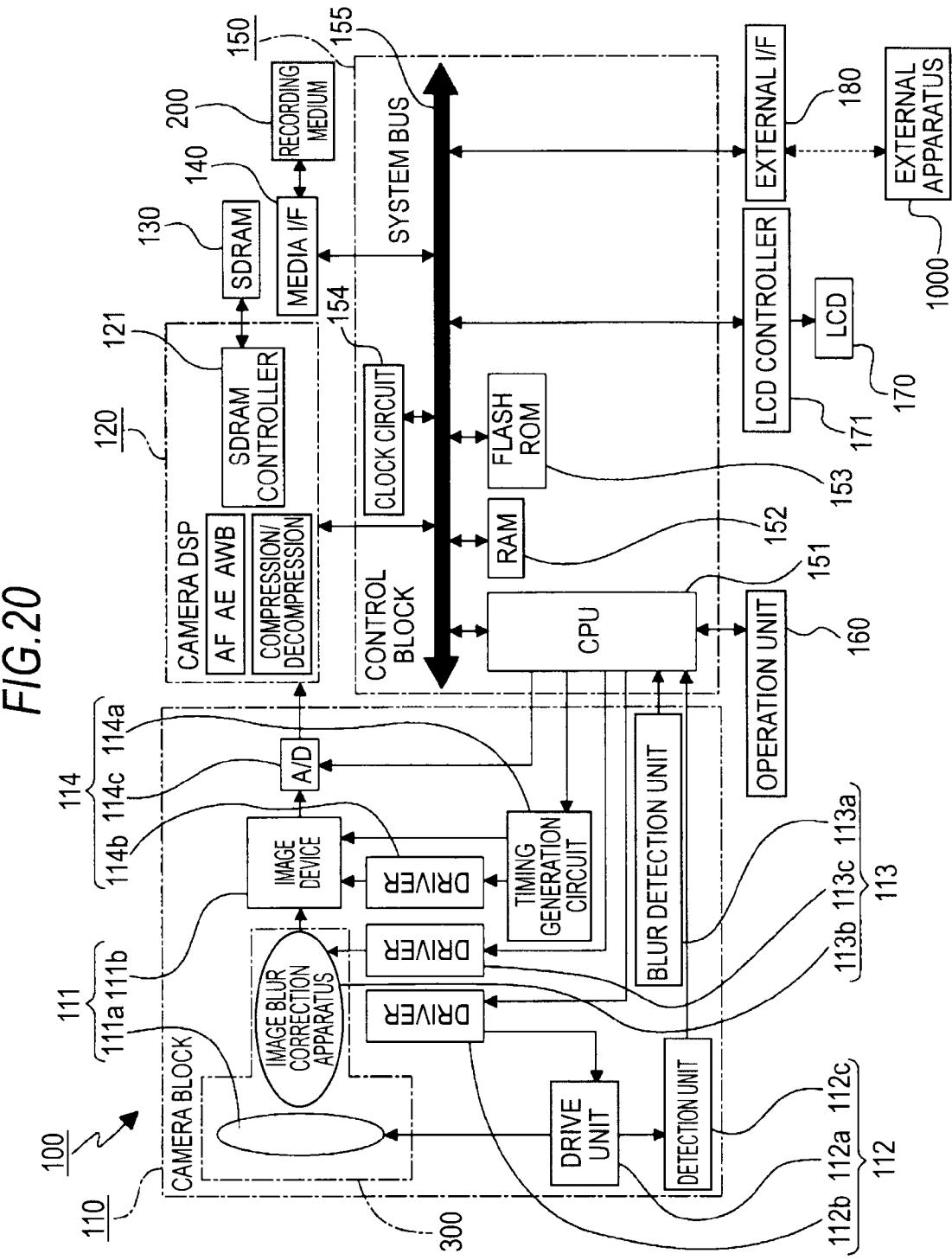
FIG. 20 is a block diagram of an imaging apparatus.

An example of an imaging apparatus will next be described (see FIG. 20).

An imaging apparatus 100 includes a camera block 110, a camera DSP (digital signal processor) 120, an SDRAM (synchronous dynamic random access memory) 130, a media interface 140, a control block 150, an operation unit 160, an LCD (liquid crystal display) 170, and an external interface 180. A recording medium 200 can be loaded and unloaded to and from the imaging apparatus 100.

The recording medium 200 can be what is called a memory card based on a semiconductor memory, a recordable DVD (digital versatile disk), a recordable CD (compact disc), and a variety of other disk-type recoding media.

The camera block 110 includes an imaging unit 111, a lens drive system 112, a hand-shaking correction system 113, and an image retrieve system 114.

The imaging unit 111 includes an imaging lens 111a for producing an optical image and an imaging device 111b that converts the produced optical image into an electric signal. The imaging device 111b is, for example, a CCD or a CMOS device described above.

The lens drive system 112 has a function of driving a movable lens in the imaging lens 111a to perform zooming and focusing. The lens drive system 112 includes a drive unit 112a, such as a stepper motor, for driving the movable lens, a driver 112b that sends a drive signal to the drive unit 112a, and detection means 112c for feeding back the operation of the drive unit 112a.

The hand-shaking correction system 113 includes blur detection unit 113a, such as a detection device that detects image blur that occurs in the imaging apparatus 100, and a driver 113c that drives an image blur correction apparatus 113b based on the detection result provided from the blur detection unit 113a. The image blue correction apparatus 113b corresponds to any of the image blue correction apparatus 1, 31, and 31A described above.

The image blue correction apparatus 113b may be disposed in a housing along with the imaging lens 111a. The image blue correction apparatus 113b and the imaging lens 111a disposed in the housing form a lens barrel 300. The lens barrel 300 may be what is called an exchangeable lens attachable and detachable to and from the body of the imaging apparatus 100 or may be integrated with the body.

The image retrieve system 114 includes a timing generation circuit 114a that produces a drive timing at which the imaging device 111b is driven under the control of the control block 150, a driver 114b that drives the imaging device 111b based on the timing generated by the timing generation circuit 114a, and an A/D conversion circuit 114c that converts an analog signal extracted from the imaging device 111b into a digital signal.

The A/D conversion circuit 114c performs CDS (correlated double sampling) on image information contained in the inputted electric signal to ensure a satisfactory S/N ratio, performs AGC (automatic gain control) to control the gain, performs A/D (analog/digital) conversion to produce image data in the form of a digital signal, and performs other processing.

The camera DSP 120 performs AF (auto focus), AE (auto exposure), AWB (auto white balance), and other signal processing on the image data inputted from the A/D conversion circuit 114c. The image data having undergone AF, AE, AWB, and other signal processing are compressed by using a predetermined method and outputted to and recorded on the recording medium 200 under the control of the control block 150.

The camera DSP 120 includes an SDRAM controller 121, which instructs the SDRAM 130 to read and write data at high speed.

The control block 150 is a microcomputer formed of a CPU (central processing unit) 151, a RAM (random access memory) 152, a flash ROM (read only memory) 153, a clock circuit 154, and other components connected to each other via a system bus 155 and has a function of controlling the components in the imaging apparatus 100.

The CPU 151 sends instruction signals to the drivers 112b and 113c, the driver 114b via the timing generation circuit 114a, and other components to operate them.

The RAM 152 is primarily used as a working area for temporarily storing in-process results.

The flash ROM 153 stores a variety of programs executed in the CPU 151, data necessary for a variety of processes, and other information.

The clock circuit 154 outputs the current year, month, and date, the current day of the week, the current time, the date and time at which an image is captured, and other information.

The operation unit 160 is a touch panel, control keys, or other components provided on an exterior housing of the imaging apparatus 100. When the operation unit 160 is operated, a signal according to the operation is inputted to the CPU 151, which then sends an instruction signal to a relevant component based on the input signal.

The LCD 170 is controlled by an LCD controller 171 connected to the system bus 155. The LCD 170 displays image data and other various pieces of information based on a drive signal from the LCD controller 171.

The external interface 180 is connected to the system bus 155. The external interface 180 is a connector that connects an external apparatus 1000, such as a personal computer, to the imaging apparatus 100. Connecting the external apparatus 1000 to the imaging apparatus 100 via the external interface 180 allows the imaging apparatus 100 not only to receive image data from the external apparatus 1000 and record the image data on the recording medium 200 but also to output image data recorded on the recording medium 200 to the external apparatus 1000. The recording medium 200 is connected to the control block 150 via the media interface 140 connected to the system bus 155.

Further, connecting the external apparatus 1000, such as a communication module, to the imaging apparatus 100 via the external interface 180 allows, for example, connection to a network, such as the Internet, and acquisition of a variety of image data and other information, recording of the acquired data and other information on the recording medium 200, and transmission of data recorded on the recording medium 200 to a destination apparatus over the network.

The external interface 180 can be a wired interface based, for example, on IEEE (Institute of Electrical and Electronics Engineers) 1394 or USB (universal serial bus) or an optical or radio wireless interface.

Image data recorded on the recording medium 200 is read therefrom based on an operation signal according to user's operation performed through the operation unit 160, and the read image data is sent to the camera DSP 120 via the media interface 140.

The camera DSP 120 decompresses (expands) the compressed image data read and inputted from the recording medium 200 and sends the decompressed image data to the LCD controller 171 via the system bus 155. The LCD controller 171 sends an image signal based on the inputted image data to the LCD 170, which then displays an image based on the image signal.

[Overview]

As described above, in any of the image blur correction apparatus 1, 31, and 31A and the imaging apparatus 100 including the image blur correction apparatus, the first line L1 extending in the direction determined by connecting the center of the first support shaft 7*a*, 35*a*, or 32*c* to the center of the second support shaft 22*b*, 48*b*, or 48*d* is perpendicular to the second line L2 extending in the direction determined by connecting the center of the second support shaft 22*b*, 48*b*, or 48*d* to the center of the lens 24 or 50 or the imaging device.

In this case, when the first driven unit 3 or 33 is pivoted in the first direction around the first support shaft 7*a*, 35*a*, or 32*c*, the second support shaft 22*b*, 48*b*, or 48*d* is not moved in the direction inclined by approximately 45 degrees to the second direction, which is the direction in which the second driven unit 4, 34, or 34A is driven, and hence correction made in the first direction little affects correction made in the second direction.

Further, since a substantially central portion of the first actuators 21 or 53 is present on the first line L1, and a substantially central portion of the second actuators 26 or 54 is present on the second line L2, the first driven unit 3 or 33 is pivoted in the first direction and the second driven unit 4, 34, or 34A is pivoted in the second direction more efficiently.

As described above, since correction made in the first direction little affects correction made in the second direction, and the first driven unit 3 or 33 is pivoted in the first direction and the second driven unit 4, 34, or 34A is pivoted in the second direction more efficiently, the performance in blur correction can be improved.

The above description has been made with reference to the case where the first magnet 20 or 51 and the second magnet 25 or 52 are attached to the movable first driven unit 3 and second driven unit 4, 34, or 34A, and the first drive coil 13 or 40 and the second drive coil 15 or 42 are attached to the flexible wiring board 27 or 55 attached to the immobile fixed member 2, 32, or 32A.

Conversely, in any of the image blur correction apparatus described above, the actuators may be so configured that the drive coils are attached to the movable-side units and the magnets are attached to the immobile-side unit.

The specific shapes and structures of the components shown in the mode for carrying out the invention described above are only examples for embodying the invention. The technical extent of the invention should not be construed in a limited sense by these specific shapes and structures.

The present application contains subject matter related to that disclosed in Japanese Priority Patent Application JP 2010-143692 filed in the Japan Patent Office on Jun. 24, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image blur correction apparatus comprising:
a fixed member;
a first driven unit pivotally supported by the fixed member around a first support shaft extending in a direction parallel to an optical axis direction;
a second driven unit holding a lens or an imaging device and pivotally supported by the first driven unit around a second support shaft extending in the direction parallel to the optical axis direction;
a first actuator that pivots the first and second driven units around the first support shaft; and
a second actuator that pivots the second driven unit around the second support shaft,
wherein when a first line is defined as a line extending in a direction determined by connecting the center of the first support shaft to the center of the second support shaft, and a second line is defined as a line extending in a direction determined by connecting the center of the second support shaft to the center of the lens or the imaging device,
the first line and the second line are perpendicular to each other, and
a substantially central portion of the first actuator and a substantially central portion of the second actuator are present on the first or second line.

2. The image blur correction apparatus according to claim 1,
wherein a substantially central portion of the first actuator is present on the first line, and
a substantially central portion of the second actuator is present on the second line.

3. The image blur correction apparatus according to claim 1, further comprising:
a first detection device that detects the position of the first driven unit in the direction of the pivotal motion thereof; and a second detection device that detects the position of the second driven unit in the direction of the pivotal motion thereof, wherein the first detection device is disposed on the first line, and the second detection device is disposed on the second line.

4. The image blur correction apparatus according to claim 1, wherein a substantially central portion of the first actuator and a substantially central portion of the second actuator are present on the second line.

5. The image blur correction apparatus according to claim 1, further comprising:

a first detection device that detects the position of the second driven unit in the direction of the first line in the direction of the pivotal motion of the second driven unit; and a second detection device that detects the position of the second driven unit in the direction of the second line in the direction of the pivotal motion of the second driven unit, wherein the first and second detection devices are disposed on the second line.

6. The image blur correction apparatus according to claim 1, further comprising a pair of guide shafts both axial ends of each of which are fixed to the fixed member, wherein the second driven unit is supported by the pair of guide shafts.

7. The image blur correction apparatus according to claim 1, wherein the first support shaft is a single contiguous shaft extending in the direction parallel to the optical axis direction.

8. The image blur correction apparatus according to claim 1, wherein the second support shaft is a single contiguous shaft extending in the direction parallel to the optical axis direction.

9. The image blur correction apparatus according to claim 1, wherein the first and second support shafts are single contiguous shafts extending in the direction parallel to the optical axis direction.

10. An imaging apparatus comprising:

an image blur correction apparatus that corrects image blur by moving a lens or an imaging device in a direction perpendicular to an optical axis direction, the image blur correction apparatus including
a fixed member,
a first driven unit pivotally supported by the fixed member around a first support shaft extending in a direction parallel to the optical axis direction,
a second driven unit holding the lens or the imaging device and pivotally supported by the first driven unit around a second support shaft extending in the direction parallel to the optical axis direction,
a first actuator that pivots the first and second driven units around the first support shaft, and
a second actuator that pivots the second driven unit around the second support shaft, wherein when a first line is defined as a line extending in a direction determined by connecting the center of the first support shaft to the center of the second support shaft, and a second line is defined as a line extending in a direction determined by connecting the center of the second support shaft to the center of the lens or the imaging device, the first line and the second line are perpendicular to each other, and a substantially central portion of the first actuator and a substantially central portion of the second actuator are present on the first or second line.

* * * * *